(12) United States Patent
Panaitopol

(10) Patent No.: US 10,582,512 B2
(45) Date of Patent: Mar. 3, 2020

(54) DIRECT COMMUNICATION BETWEEN MOBILE RADIO COMMUNICATION DEVICES

(71) Applicant: NEC Corporation, Tokyo (JP)

(72) Inventor: Dorin Panaitopol, Berkshire (GB)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/780,679

(22) PCT Filed: Dec. 27, 2013

(86) PCT No.: PCT/JP2013/085364
§ 371 (c)(1),
(2) Date: Sep. 28, 2015

(87) PCT Pub. No.: WO2014/155897
PCT Pub. Date: Oct. 2, 2014

(65) Prior Publication Data
US 2016/0057761 A1 Feb. 25, 2016

(30) Foreign Application Priority Data
Mar. 28, 2013 (GB) .................................. 1305824.3

(51) Int. Cl.
*H04W 72/08* (2009.01)
(52) U.S. Cl.
CPC ................................ *H04W 72/085* (2013.01)
(58) Field of Classification Search
CPC ... H04W 28/18; H04W 4/005; H04W 72/085; H04W 76/023; H04W 92/18
See application file for complete search history.

(56) References Cited

U.S. PATENT DOCUMENTS

| 6,532,369 B1 | 3/2003 | Myer |
| 9,148,887 B2 | 9/2015 | Iwamura et al. |

(Continued)

FOREIGN PATENT DOCUMENTS

| EP | 1 998 499 | 12/2008 |
| JP | 2003-510950 A | 3/2003 |

(Continued)

OTHER PUBLICATIONS

International Search Report, PCT/JP2013/085364, dated Feb. 10, 2014.

(Continued)

*Primary Examiner* — Ayaz R Sheikh
*Assistant Examiner* — Debebe A Asefa
(74) *Attorney, Agent, or Firm* — Sughrue Mion, PLLC

(57) ABSTRACT

The present invention provides for a wireless communications method and related system and wireless terminal devices arranged for communication between first (304, 404) and second (306, 408) wireless terminal devices by way of direct communication, for example by way of a D2D link in a network environment, the method and system and, as appropriate, devices, being arranged to provide for the delivery of link-quality parameter information from at least one of the two terminal devices to the network for communications interaction by the network with communication between for the two terminals in direct communication.

3 Claims, 20 Drawing Sheets

(56) References Cited

U.S. PATENT DOCUMENTS

| | | | |
|---|---|---|---|
| 2005/0135295 A1* | 6/2005 | Walton | H04W 74/0816 370/328 |
| 2009/0175214 A1 | 7/2009 | Sfar et al. | |
| 2011/0223953 A1 | 9/2011 | Lee et al. | |
| 2012/0327851 A1* | 12/2012 | Wentink | H04W 76/023 370/328 |
| 2013/0273923 A1* | 10/2013 | Li | H04W 28/02 455/450 |
| 2014/0094122 A1* | 4/2014 | Etemad | H04W 76/02 455/41.2 |
| 2014/0219116 A1 | 8/2014 | Iwamura et al. | |
| 2014/0243040 A1* | 8/2014 | Bienas | H04W 76/23 455/552.1 |

FOREIGN PATENT DOCUMENTS

| | | |
|---|---|---|
| JP | 2004-529530 A | 9/2004 |
| JP | 2008-527884 A | 7/2008 |
| JP | 2012-227884 A | 11/2012 |
| JP | 2014-522601 A | 9/2014 |
| KR | 10-1204302 B1 | 11/2012 |
| WO | 2010/049801 | 5/2010 |
| WO | 2011/069295 | 6/2011 |
| WO | 2011/138495 | 11/2011 |
| WO | 2012/068224 A1 | 5/2012 |
| WO | WO 2012/060934 | 5/2012 |
| WO | WO 2012/137634 | 10/2012 |
| WO | 2012150815 A2 | 11/2012 |
| WO | 2012/166975 | 12/2012 |
| WO | 2014/131556 A1 | 9/2014 |

OTHER PUBLICATIONS

GB Search Report, 1305824.3, dated Sep. 24, 2013.
"Evaluation requirements for D2D" 3GPP technical report RP-122009, by Huawei and HiSilicon.
3GPP publication FS_ProSe, 3GPP publication TR 22.803.
3GPP publication SP-120456.
3GPP publication S1-121247 (TCCA).
3GPP publication R1-130133 ZTE—"Evaluation methodology for D2D discovery".
3GPP publication TR 36.932.
Intel, ProSe Use Case for Unidirectional D2D Communication, 3GPP TSG-SA WG1 Meeting #57, S1-120065, Feb. 17, 2012, p. 1-p. 3 (http://www.3gpp.org/ftp/TSG_SA/WG1_Serv/TSGS1_57_Kyoto/docs/S1-120065.zip).
Texas Instruments, Scenarios and Requirements for Device to Device Proximity Services, 3GPP TSG-RAN WG1 Meeting #72 R1-130103, Feb. 1, 2013, p. 1-p. 2 (http://www.sgpp.org/ftp/TSG_RAN/WG1_RL1/TSGR1_72/Docs/ R1-130103.zip).
Extended European Search Report—EP 13 87 9735—dated Sep. 27, 2016.
European Office Action dated Jun. 27, 2017 in corresponding European Patent Application No. 13879735.2.
Communication dated Jan. 23, 2018, from the Japanese Patent Office in counterpart application No. 2015-546741.
Communication dated Aug. 7, 2018, from the Japanese Patent Office in counterpart application No. 2015-546741.
Communication dated Jan. 8, 2019 from the Japanese Patent Office in counterpart Application No. 2015-546741.
Communication dated Apr. 15, 2019 from the European Patent Office in application No. 13879735.2.
Communication dated Jan. 3, 2018 from the European Patent Office in counterpart application No. 13 879 735.2.
Communication dated Sep. 26, 2019, issued by the Intellectual Property of India in corresponding application No. 8997/DELNP/2015.

* cited by examiner

DIRECT COMMUNICATION BETWEEN MOBILE RADIO COMMUNICATION DEVICES

TECHNICAL FIELD

The present invention relates to a direct communication link between two wireless terminals, such as mobile radio communication devices, and in particular to such devices performing Device to Device (D2D) communication.

BACKGROUND ART

It is currently provided that two wireless terminals, examples of which according to several modern communications standards are referred to as a number of User Equipment (UE) can communicate with one another directly by means of D2D communication, and which of course is provided in addition to normal network connectivity. It has been suggested that valuable services could be provided by Third Generation Partnership Project (3GPP) wireless communication systems based on UEs being in proximity to each other. Such services could include Public Safety services and non-Public-Safety services that potentially would be of interest to operators and users.

For example, 3GPP technical report RP-122009, by Huawei and HiSilicon is entitled "Evaluation requirements for D2D", 3GPP publication FS_ProSe, TR 22.803, and SP-120456-MoU between TETRA & Critical Communications Association (TCCA) & the National Public Safety Telecommunications Council), and S1-121247 (TCCA).

Also, 3GPP publication R1-130133 (ZTE—"Evaluation methodology for D2D discovery") proposes that D2D-based proximity services (D2D ProSe) could be realized within or without 3GPP Long-term Evolution (LTE) network coverage, and in both cases detection signals would be used by UEs for D2D proximity direct discovery without position information.

There is currently a need for improvements relating to three technical aspects of D2D communications: discovery; D2D communication and signalling (including PHY and MAC layers, control layer and protocol design); and mitigation of the effects of noise and interference. Discussions below are concerned mainly with the last two of these technical aspects.

The physical environment in which wireless communication terminals are located changes over time. This can be due to changes in position, interference from other base stations or other terminals, power of received signals, distance between terminals, multipath attenuation etc. Also, D2D communication may affect cellular communication by interference of a signal used in the direct (D2D) communication link with signal(s) used in the cellular communication; and/or a D2D communication link may affect other D2D communication links by interference of a signal used in the direct (D2D) communication link with signal(s) used in such other D2D communication links.

Currently, the direct link (D2D link) between two terminals is established and maintained by means of signals transmitted between the two terminals and control of the quality of the direct link between the terminals is disadvantageously limited.

The present invention seeks to provide for wireless communications methods and related communications systems and terminal devices having advantages over known such methods, systems and terminals.

CITATION LIST

Non Patent Literature

NPL 1: "Evaluation requirements for D2D" 3GPP technical report RP-122009, by Huawei and HiSilicon.
NPL 2: 3GPP publication FS_ProSe.
NPL 3: 3GPP publication TR 22.803.
NPL 4: 3GPP publication SP-120456.
NPL 5: 3GPP publication S1-121247 (TCCA).
NPL 6: 3GPP publication R1-130133 ZTE—"Evaluation methodology for D2D discovery"
NPL 7: 3GPP publication TR 36.932.

SUMMARY OF INVENTION

Technical Problem

Currently, the direct link (D2D link) between two terminals is established and maintained by means of signals transmitted between the two terminals and control of the quality of the direct link between the terminals is disadvantageously limited.

Solution to Problem

According to one aspect of the invention there is provided a wireless communications method for communication between first and second wireless terminal devices arranged to communicate by direct communication by way of a direct link in a network environment, the method including the step of delivering direct-link-quality parameter information from at least one of the two terminal devices to the network for interaction by the network with communication between the two terminals in direct communication.

The invention can advantageously employ the sending of device to device measurements/statistics associated with one link and one wireless terminal device in an efficient manner to the network for handling.

The said interaction by the network be employed as required but in particular can comprise network control of communication between the first and second terminal devices, or for example can comprise network planning procedures such as for the purpose of Minimization of Drive Tests.

The said terminal device can comprise any appropriate device such as a wireless network UE, or for example a Low Power Node.

Further, the link-quality parameter information can comprise terminal device transmission information and/or terminal device reception information.

Also, the said link-quality parameter information comprises Quality of Service statistics.

According to another aspect of the present invention there is provided a method of operation within a wireless communications terminal device arranged for direct communication with a further wireless communications terminal device by way of a link in a network environment, the method including the step of delivering link-quality parameter information from the said wireless communications terminal device to the network for interaction by the network with communication between the terminals in the said direct communication.

As will be appreciated, the said wireless communications terminal device can be arranged to deliver a signal in accordance with the general wireless communications method outlined above.

Further, all aspects of the present invention can involve communication provided by way of a 3GPP air interface, or alternatively provided by non-3GPP technology such as, or example, but not limited to, a Wi-Fi, FlashLinkQ, WiMax or Bluetooth link.

According to yet a further aspect of the present invention, there is provided a wireless communications system comprising first and second wireless terminal devices arranged for direct communication by way of a link in a network environment, the system being arranged for delivery of link-quality parameter information from at least one of the two terminal devices to the network for interaction by the network with the communication between the said first and second wireless terminal devices in direct communication.

The system can be arranged to operate in accordance with any one or more of the features of the methods defined and described herein.

That is, in particular, in the system the said at least one wireless terminal device can be arranged to deliver a signal to the network comprising an indication of quality of wireless link between the first and second terminals, and the said at least one wireless terminal is further arranged to receive a wireless command signal for control of the link-quality perimeter in response to the command signal.

Advantageously, the network control can provided by way of a closed control loop, which, if required, can comprise a slow outer loop. The control loop can also allow for the collection of current Tx/Tx parameters and, if required, give a maximum, range or some other target limit.

According to still a further aspect of the present invention there is provided a wireless communications terminal device arranged for direct communication with a further wireless communications terminal device by way of a link in a network environment, the said wireless communications terminal device being arranged to deliver link-quality parameter information to the network for interaction by the network with the said direct communication.

Again, the operability of such a device can be consistent with one or more of the features of the system and methods outlined above.

In particular the present invention finds particular use within a D2D communications environment.

The invention advantageously identifies that D2D power control and/or resource allocation and/or other transmission and reception parameters (such as coding scheme, number of retransmissions, etc.) can be performed by a cellular wireless network, and doing so can reduce interference to other user and/or a number of network equipment by controlling signals transmitted in a D2D link.

As will therefore be appreciated, the invention proposes that control of the quality of a direct communication link between two wireless terminals be achieved by way of part of a communication network connected to at least one of the two wireless terminals. Accordingly, in a general sense, apparatus, systems and methods disclosed herein are arranged to allow for network control of the quality of the direct link.

Also, it should be appreciated that link-quality parameters can be Tx (e.g. power) and Rx (e.g. BLER). In particular Quality is not to be considered only QoS, because Tx power is not a QoS parameter. For the control "slow" loop, not only current values (power, BLER, retransmissions) but also control values (generally speaking a target, a max, a range etc) should advantageously be sent.

Further, the commands or the measurement reports can be triggered, or event based, or periodical.

The above and further features and aspects of the invention and are explained in more detail, by way of illustration only, in the following detailed description of embodiments of the invention and with reference to the accompanying drawings.

Advantageous Effects of Invention

The present invention can provide for wireless communications methods and related communications systems and terminal devices having advantages over known such methods, systems and terminals.

DESCRIPTION OF EMBODIMENTS

Figure 1:
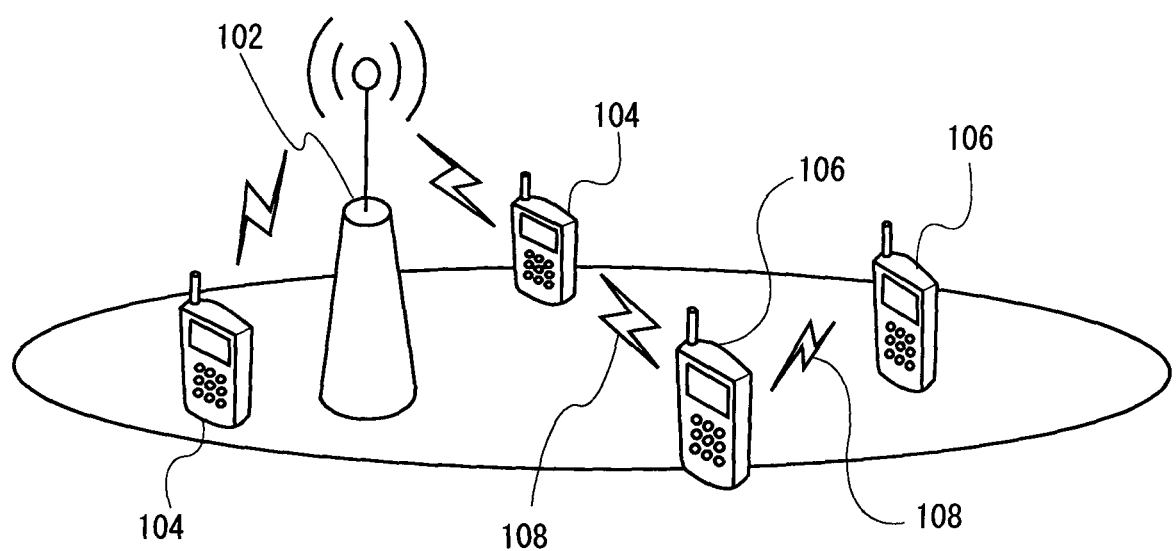
FIG. 1 is a simplified representation of a network arrangement of a base station and plural wireless communication terminals.

Turning first to FIG. 1, there is provided a simplified representation of part of a cellular mobile radio communications network including a base station 102 of a cell and arranged to communicate with at least one of plural wireless communication terminals 104, 106 of the type commonly referred to as User Equipment (UE) and which can each transmit a beacon signal 108 for indicating their presence and can also receive and detect such a beacon signal 108 and thereby discover nearby wireless terminals. In this example, UEs 104 are in communication with the base station 102, but UEs 106 may not be in communication with the base station. In particular in this illustrated example, the UE 104 shown left of base station 102 is a legacy device, whereas the UE 104 to the right of the base station 102 is capable of measuring/receiving a beacon from one of the other UEs 106 as noted. Both of the aforementioned UEs 104 and 106 comprise enhanced UEs having potential use for UE-R transmission and D2D purposes.

Figure 2:
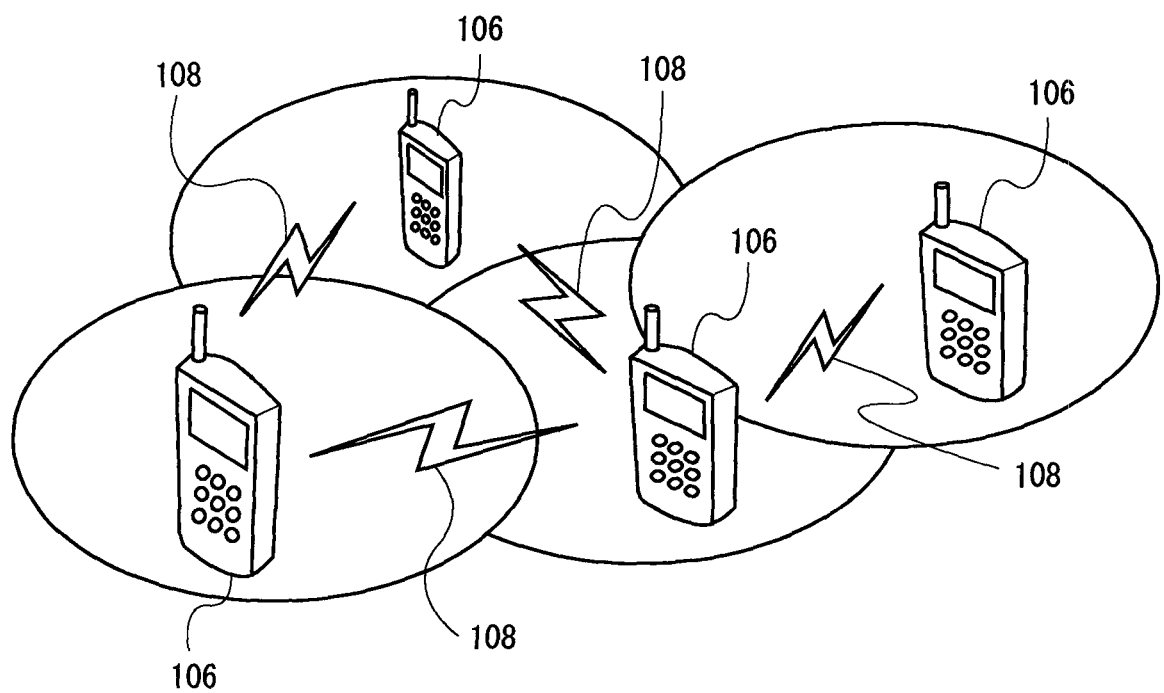
FIG. 2 is a simplified representation of a network arrangement of plural wireless communication terminals which can each transmit a beacon signal for indicating their presence.

FIG. 2 is a simplified representation of plural wireless communication terminals 106 spaced from one another but proximal to each other, which can each transmit a beacon signal 108 for indicating their presence and can receive and detect such a beacon 108 and thereby discover nearby wireless terminals 106. In this example, the terminals perform discovery without interacting with a base station and independent of receiving any signal from a base station.

Possible scenarios are now explained with reference to FIG. 3 and FIG. 4, in which an aspect of the present invention can be employed. In particular, detail regarding the use of the link quality measurements/statistics is provided further below.

Figure 3:
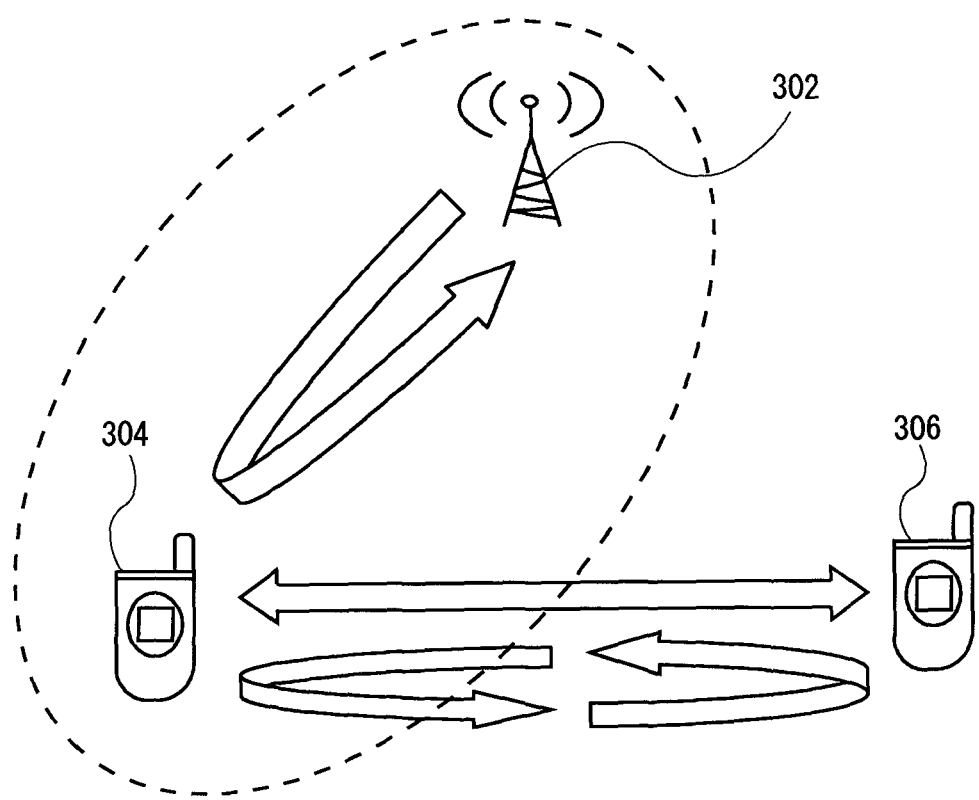
FIG. 3 is a simplified schematic representation of a base station in communication with a wireless terminal, and another wireless terminal which is out of coverage of the base station.

FIG. 3 is a simplified schematic representation of a cellular network arrangement employing a base station 302 and which is in communication with UE 304. Another UE 306 is illustrated and which is out of coverage of the base station 302, that is UE 306 cannot establish or maintain a communication link with the base station 302 because the physical environment of the link is adverse, for example the distance to the base station, and thus the path attenuation between the base station and UE 306 is so large that UE 306 cannot receive and decode a signal transmitted by the base station 302, or vice versa.

In this scenario, where one 306 of the UEs is out-of-coverage, UE 304 can nevertheless perform Device-to-Device (D2D) communication with the out-of-service UE 306 under network control, because the network control can take place through, or via, UE 304 by means of signalling between the wireless terminal 304 and the base station 302.

Figure 4:
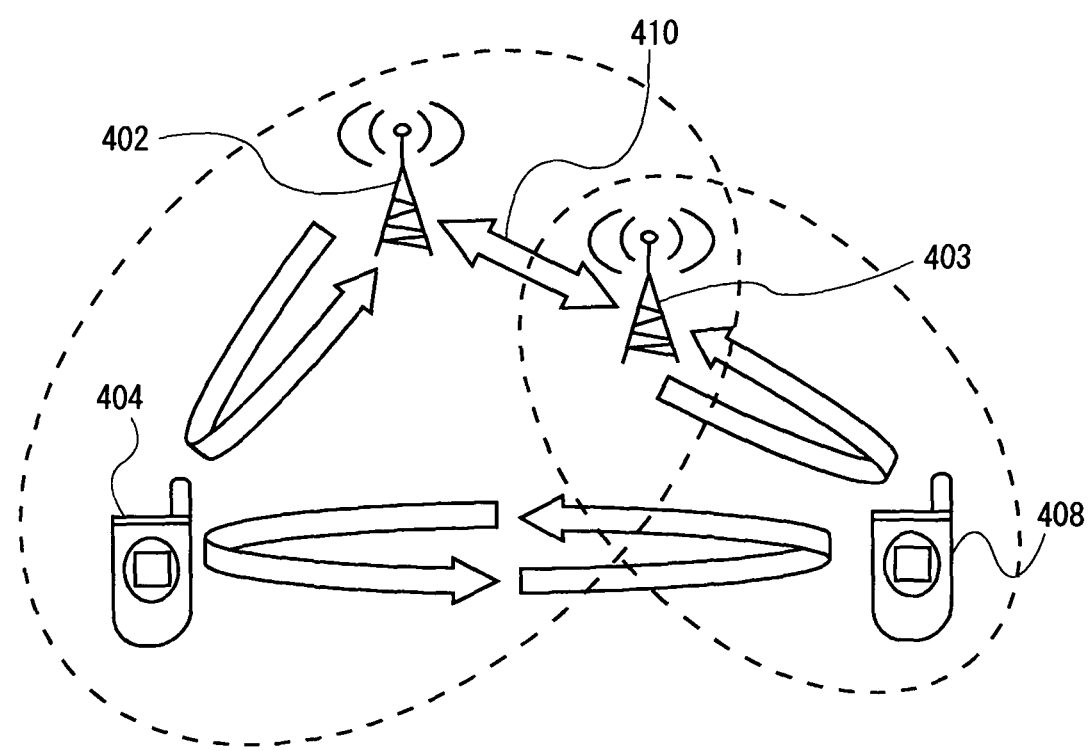
FIG. 4 is a simplified schematic representation of a base station in communication with a wireless terminal, and another wireless terminal which is out of coverage of the base station but within coverage of another base station.

FIG. 4 is another simplified schematic representation of a cellular network arrangement (inter-cell D2D scenario) including a base station 402 in communication with a UE 404. Another UE 408 is illustrated which is out of coverage of the base station 402. However, UE 408 is within coverage of another base station 403. The two base stations 402, 403 are in communication with each other via a network connection as indicated by double-ended arrow 410, and in this manner the two base stations 402, 403 can therefore provide a connection between the two UEs 404, 408 by way of the network connection 410. In the figure, the network connection 410 is via an 'X2 interface' directly between the base stations. However, the connection could equally be via another network entity common to the base stations 402, 403. For example, the base stations may both be connected to a common mobility management entity (MME) and in such a scenario D2D control would be performed by the MME.

In this inter-cell D2D scenario, the UE 404 can initiate and control D2D communication with UE 408 under network control. Furthermore, UE 408 can initiate and control D2D communication with UE 404 under network control, because the network control can be achieved by way of UE 408 and base station 403.

Thus, one of the UEs initiates and controls the D2D link in order to communicate with the other UE via the D2D link and to maintain good or acceptable communication under different D2D link conditions, without interfering unduly with other UEs or network equipment with which it not in communication. The UE achieves this whilst not consuming more resources than required, such resources including power consumption of the UE, and resource block(s) (RB) used by the UE.

In another arrangement (comprising an intra-cell D2D scenario, not illustrated), similar to that shown in FIG. 4, each of the two UEs could be within coverage of the same base station 402 which can then provide a connection between the two terminals 404, 408 without routing any signal from either of the wireless terminals via the network to another base station. In this further arrangement, and comprising an "intra-cell" scenario, either UE 404 or UE 408 can initiate and control the D2D communication.

Figure 9:
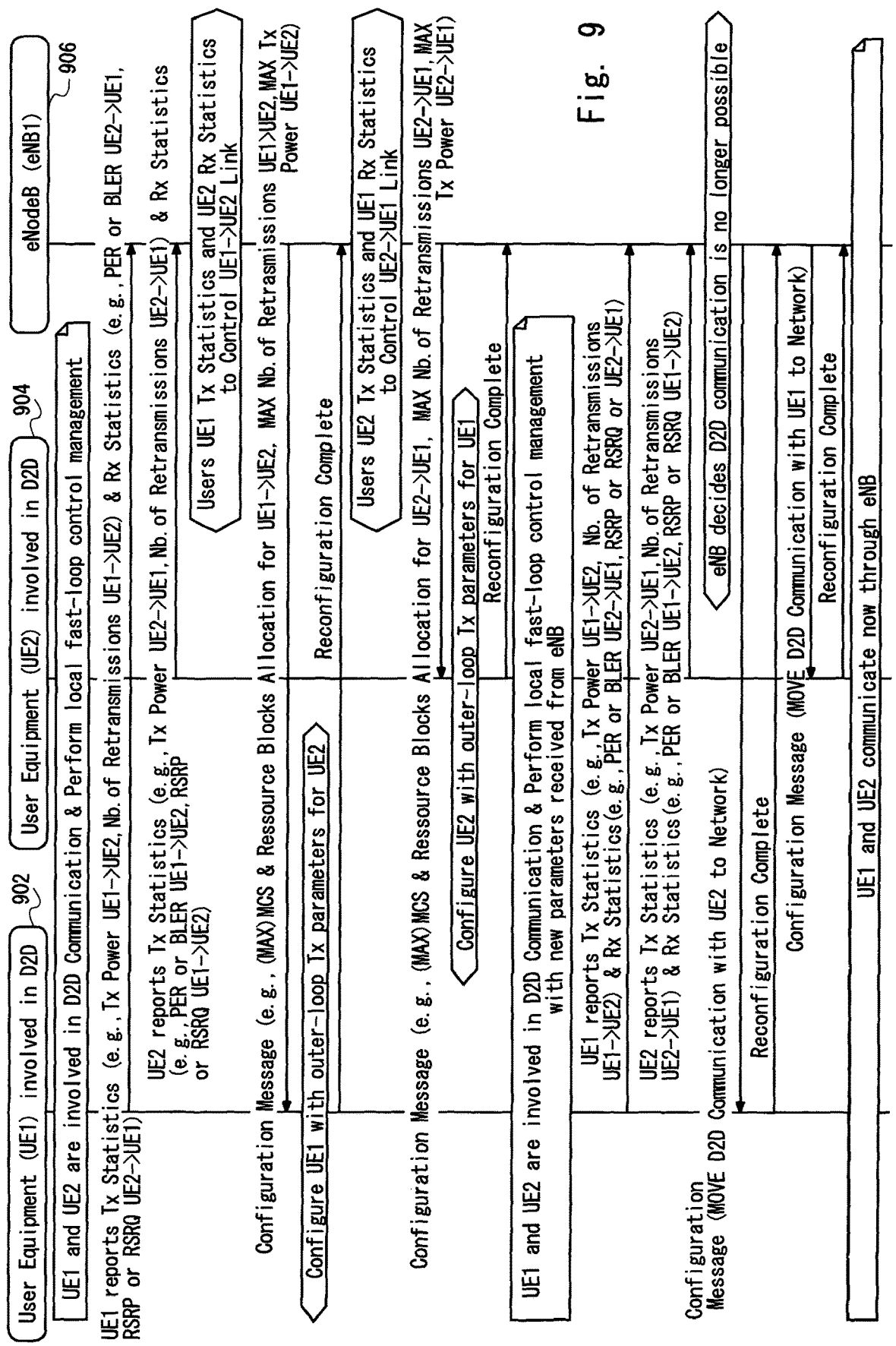
FIG. 9 is an example of a Message Sequence Chart (MSC) for control of a quality link parameter of an Intra-Cell D2D link.

According to this intra-cell scenario, according to one variant both of the two UEs are within coverage of, and may be controlled by, the same base station e.g. eNB. Example signalling for this variant is illustrated in FIG. 9, which is described in further detail below.

Figure 11:
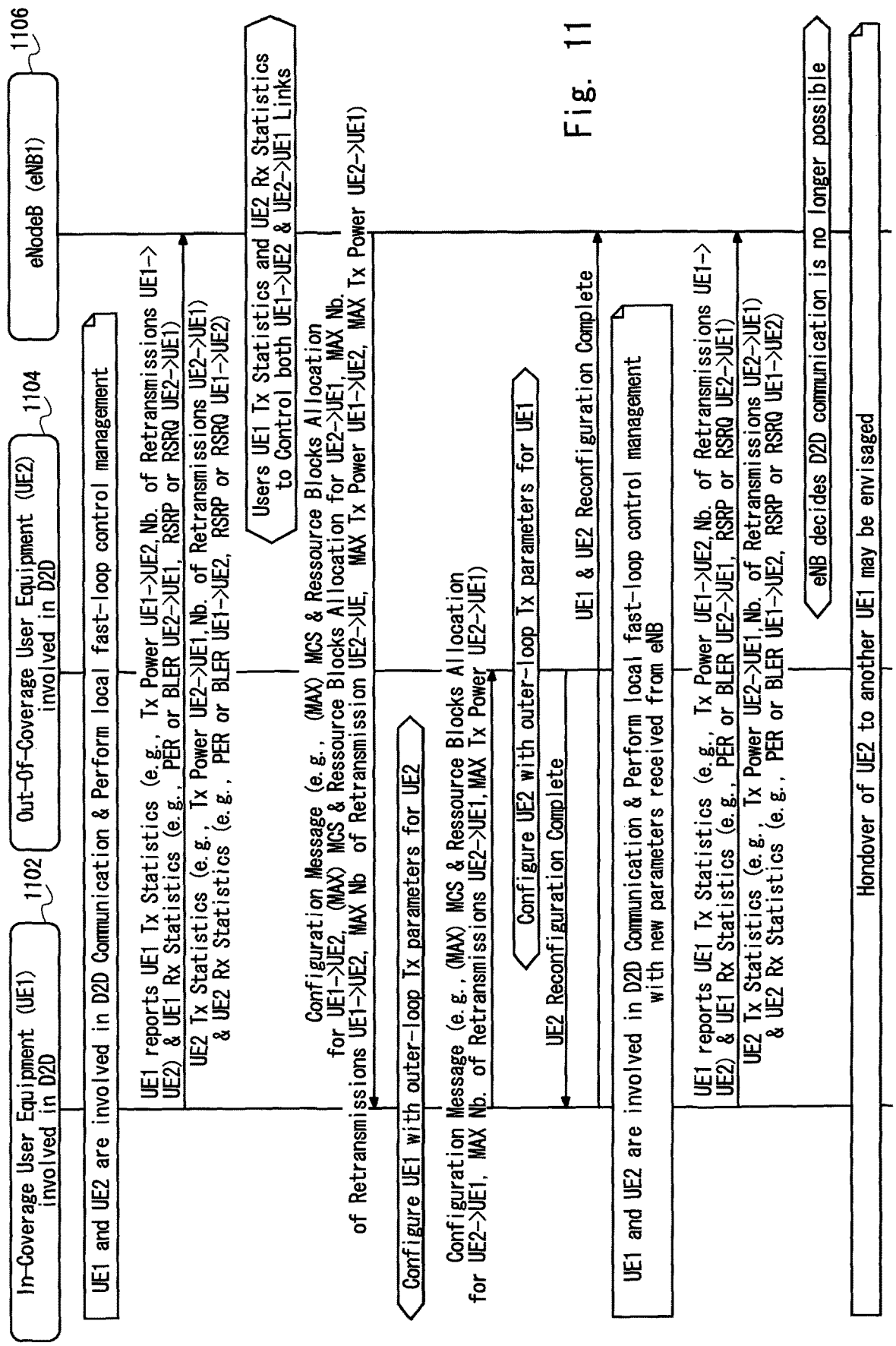
FIG. 11 is an envisaged Message Sequence Chart (MSC) for control of a quality link parameter of an Out-of-Coverage D2D link, where one of the wireless terminals is out of coverage of a base station.

According to another variant of the intra-cell scenario, only one of the UEs is controlled by the base station. Operation of this other variant would be similar to that of the arrangement illustrated in FIG. 3, and example signalling according to this other variant is illustrated in FIG. 11, which is described in further detail below.

Figure 5:
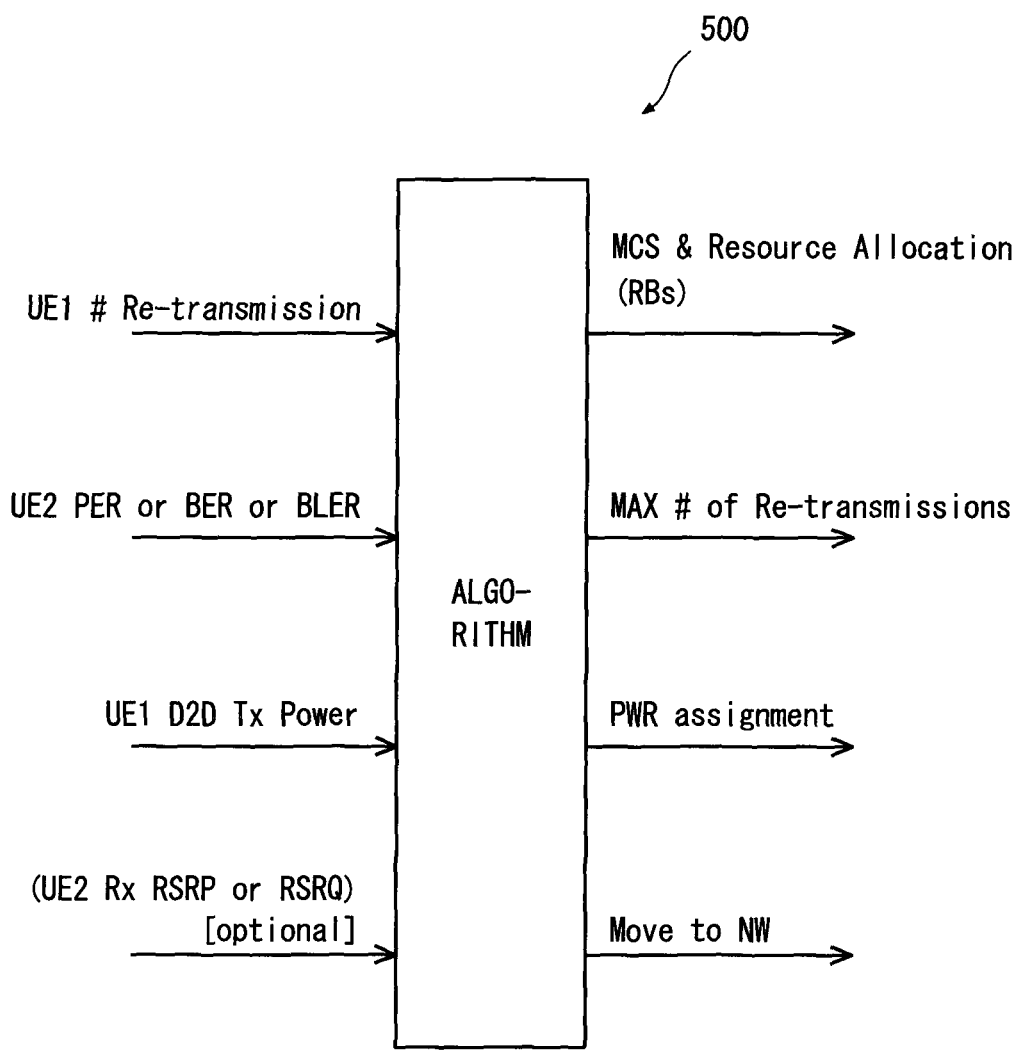
FIG. 5 is a simple diagram showing different possible combinations of inputs and outputs of an algorithm for controlling a link quality parameter of a D2D link via a base station of a network.

FIG. 5 is a schematic diagram showing different possible combinations and alternatives, with respect to inputs and outputs of the algorithm ("ALGO"). With reference to FIG. 3 and FIG. 4, the diagram in FIG. 5 shows different possible inputs and outputs of the algorithm when the algorithm is used by the wireless terminal 304, 404 (UE1) to control, via a "slow outer loop", a direct wireless link between the wireless terminal 304, 404 and the other wireless terminal 306, 408 (UE2), via the wireless terminal 304, 404. With reference to FIG. 4, the same diagram of FIG. 5 applies to using the link control algorithm to control, via a "slow outer loop", the direct wireless link between the wireless terminal 408 and the other wireless terminal 404 (UE1) via the other wireless terminal 408.

D2D link quality measurements and/or statistics may include transmission (Tx) and reception (Rx) D2D statistics of two devices (wireless terminals) involved in communications via a D2D link, and may be sent to the network for the purposes of network control of the D2D wireless link and/or MDT (Minimization of Drive Tests).

During MDT tests, the network obtains performance statistics during a so-called 'drive test' during which a UE is used as a testing means while it is deployed in one or more locations in the network coverage area. The one or more locations typically include multiple locations along a drive route along which the UE is transported for example in a vehicle.

Control of the D2D link by the network is possible because the network has a global view of the status of various devices in the network. For example for the inter-cell scenario described above in relation to FIG. 4, the base station 402 knows when UE resending information is redundant and affects Quality of Link (QoL) of D2D and the base station 402 can therefore decide which link is bad and how to control UE1 transmission (Tx) and UE2 reception (Rx). Similarly, for intra-cell scenario the base station controls both UE1 and UE2 transmissions (Tx) and reception (Rx). This would be also the case for an out-of-coverage scenario.

On the other hand, and if required, the statistics can optionally be reported only for MDT usage (e.g. network planning). In this case the network does not need to send control commands, but it will use such statistics for (further) planning purposes.

The "Fast" Inner Loop and "Slow" Outer Loop can be used together for control of one or more D2D quality-of-link parameter. The principle of such a double-loop is as follows: a "slow" loop is used for D2D resource allocation, and also transmission and reception parameters under network control and a "fast" loop is used for link adaptation of D2D to radio conditions which could be limited to the allocated resources provided by the first "slow" loop.

The "slow" loop takes much longer than the "fast" loop and has some limits imposed upon it by the network via control signalling from the network. The slow loop imposes a limit, or a target, of allocated resources. For example, the slow loop can set a maximum power level (MAX PWR) and the fast loop can adapt in response to the maximum power level that has been set by the slow loop. The slow loop determines or computes a transmit power for a UE to use for transmitting a D2D signal to the other UE.

The slow loop can, in addition to or instead of specifying a maximum transmit power, specify a range of values, or a target value, or a maximum value, for one or more other parameters associated with the D2D link, for example a modulation scheme, a maximum modulation order, a maximum number of retransmissions, etc.

The slow loop is used to obtain, and relay to the network, information/statistics regarding the D2D link, and to send one or more messages from the network to the UE, the one or more messages including a range of values, or a target value, or a maximum value, as described above in relation to transmit power control, for one or more link quality-determining parameters such as order of modulation and others.

On the other hand, the fast loop can adapt the wireless link to changes in the physical environment (e.g. path loss) and can for example use less power than the power that the slow loop determines.

In use of the invention, the "Slow" Outer Loop can be used to control the quality of link parameter without any use of a "Fast" Inner Loop. Equally the combination of "Fast" Inner Loop and "Slow" Outer Loop may be used.

Commands that may be sent through or via the "fast" inner loop, and which may be considered to be D2D commands, include: modulation (or Modulation Coding Scheme MCS); fast power control; and number of retransmissions to UE1 or UE2.

Commands that may be sent through or via the "slow" outer loop, and which may be considered to be network commands, may include: resource allocation (e.g. Modulation (MCS) & RBs) and transmission and reception parameters; maximum allowed power information such as MAX UE1/UE2 D2D power or range of UE1/UE2 D2D power or TARGET UE1/UE2 D2D power; MAX # of Retransmissions of UE1/UE2, Move D2D Link to network command.

Power Control and resource allocation are performed by the network because (as explained above): D2D communication may affect classic cellular communication (in Uplink or in Downlink) and/or D2D communication between a pair of UEs. D2D communication may therefore also affect other D2D communication between another pair of UEs.

Evaluation of delay/latency for the "slow" outer-loop and the "fast" inner-loop has resulted in the following values of various parameters:

A total of 40-50 ms is used for the <<slow>> outer-loop.
10 ms detection time of UE1 by UE2
10 ms reporting time (through RRC)
10 ms decision time (in eNB)
10 ms command time (through RRC) A total of 10 ms is normally required for the <<fast>> inner-loop.

If however the slow loop is controlled by the MME rather than by the eNB, the time necessary for slow loop control is even longer and the above timing values could be at least in the order of 20 ms longer.

The "slow" outer-loop can be justified such as Increase/Decrease D2D resources and therefore can be dealt only through the network control. Only the network can determine whether to increase or decrease resource allocation because the network is arranged to reduce, or maintain below a limit, interference from D2D devices (and D2D communications) to other D2D devices (and D2D communications) and/or other a number of typical user equipment UE network equipment such as eNBs.

It follows that the network can perform control of a D2D link by using the slow outer loop to control the fast inner loop. The slow outer loop provides constraints for the fast inner loop, the fast inner loop being more adaptive in its response to physical changes of the D2D link.

The "slow" outer-loop therefore provides a means for the network to control the power and resource allocation and transmission and reception parameters for a D2D communication link. Such resource allocation may include one or more of position of resources in the time-frequency grid (such as those illustrated in FIG. 13 and FIG. 14), modulation, number of antennas, number of retransmissions, coding scheme, and several other parameters.

Two UEs involved in D2D communication under network control are arranged to send quality-of-service (QoS) measurements or statistics to the network. The physical environment changes over time (i.e., position, interference from other cells or other users, power, distance between D2D devices etc., as discussed earlier above) and the network can be arranged to control a D2D communication link with respect to these physical changes.

The following statistics (or any combination of them) for network resource allocation ("Slow" Outer-Loop) can be used for the purposes of controlling a D2D communication link.

Transmission (Tx) Statistics of UE1 (or UE2) transmitting to UE2 (or UE1), can be transmitted by UE1 (or UE2) to the network and can include one or more of the following: Number of retransmissions "# of retransmissions"; UE1 Tx power (or UE2); current Modulation and Coding Scheme (MCS); D2D Link ID (identity of the D2D link); Transmission Mode, TM (if the network doesn't have means to know it); and other information e.g. Channel State Information CSI such as CQI (such as coding rate, modulation index and resulted channel efficiency that can be supported), number of antennas, multipath conditions, Precoding Matrix Indicator (PMI), Rank Indicator (RI), Precoding Type Indicator (PTI) etc.

Reception (Rx) Statistics obtained by UE2 (or UE1) transmitted by UE1 (or UE2), and sent by UE2 (or UE1) to the network, can include one or more of: number of NACKs/ number of received packet symbols; number of NACKs/ number of received RB; number of ACKs/number of received RB; Block Error Rate (BLER), Packet Error Rates (PER) or Bit Error Rates (BER) or Frame Error Rate (FER); and optionally Reference Signal Received Power (RSRP) or Reference Signal Received Quality (RSRQ) levels of reception from UE1 (or UE2).

As should be clear from the following, Transmission (Tx) statistics without Reception (Rx) statistics may not be sufficient for controlling the link quality of a D2D communication link, and similarly Reception (Rx) statistics without Transmission (Tx) statistics may not be sufficient for controlling the link quality.

These statistics may be useful for the "Slow" Outer-Loop (UE1 to eNB to UE2 & vice versa), the "Slow" Outer-Loop being used for allocation of network resource.

Tx statistics and/or Rx statistics may be sent by a wireless terminal to a network base station to which the wireless terminal is connected, when the wireless terminal (e.g. UE1) is connected to another wireless terminal (e.g. UE2) via a direct (in this case D2D) wireless communications link between the wireless terminals. Depending on the statistics, the base station sends a command signal to the wireless terminal for the purpose of controlling a quality link parameter of the direct wireless communications link.

UE1 Tx statistics may be sent when UE1 resends information to UE2 because UE2 is in a high interference region or because UE1 Tx power is low or modulation is of high order or because UE1 does not receive ACK because UE1 is in a high-interference region.

UE2 Rx statistics may be sent when UE2 does not receive information from UE1 because UE2 is in high interference region or UE1 power is low or modulation is of high order.

Based on these statistics the network can determine one or more of whether: the link from UE1 to UE2 is bad/good; the link UE2 to UE1 is bad/good; the bi-directional communication between UE1 and UE2 is bad/good; and UE1 and/or UE2 are in a high interference position.

The network can further send a command signal to perform one or more of: increase/decrease the Target (Maximum) # Retransmissions of UE1, UE2 or both; increase/ decrease the power of UE1, UE2 or both; change the D2D modulation scheme of UE1, UE2 or both from 64QAM/ QPSK for example to QPSK/64QAM (adaptive modulation): 64QAM→QPSK if link is bad and QPSK→64QAM if link is good; route back to the network the D2D communication: UE1 will communicate with UE2 through the network; change the resource allocated to D2D (e.g. orthogonal resource or other).

As explained briefly above, Tx statistics without Rx statistics may not be sufficient, and vice versa. It has been found that these statistics may be useful for the "Slow" Outer-Loop (UE1 to eNB to UE2 & viceversa), the "Slow" Outer-Loop dealing with network resource allocation and transmission and reception parameters control.

Figure 6:
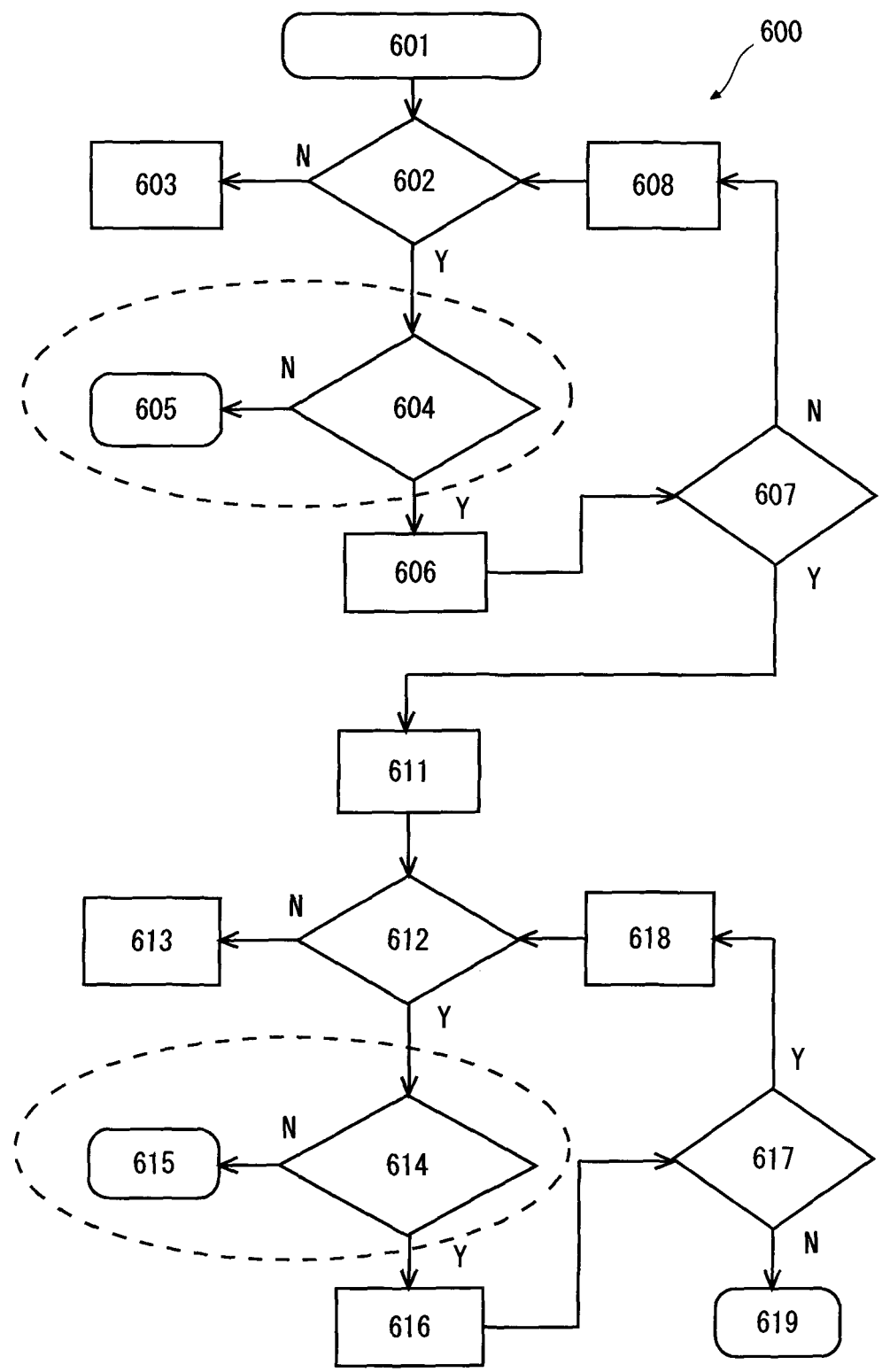
FIG. 6 is a respective flow diagram illustrating the algorithm at a high level according to respective possible implementation scheme.
Figure 7:
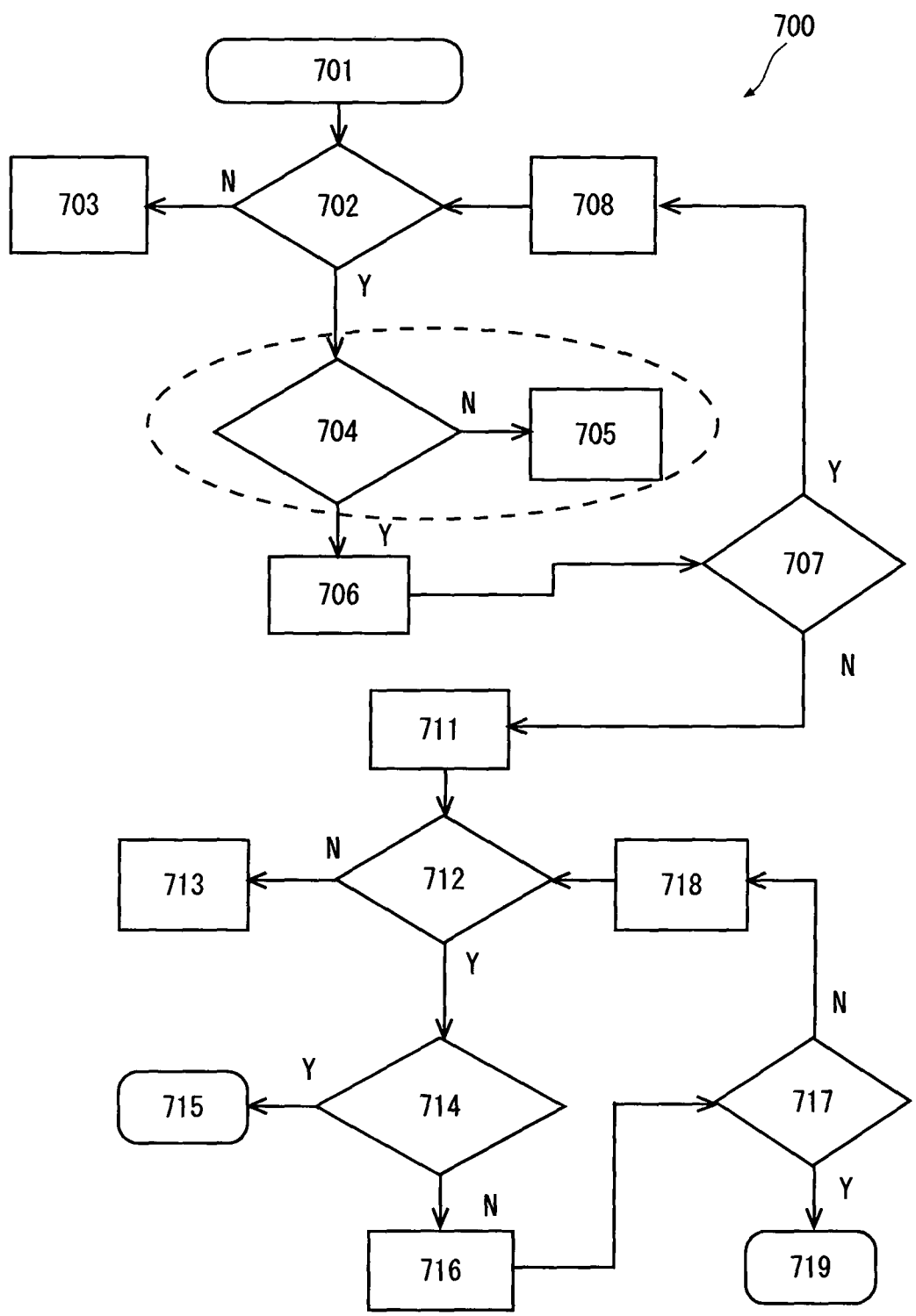
FIG. 7 is a respective flow diagram illustrating the algorithm at a high level according to respective possible implementation scheme.
Figure 8:
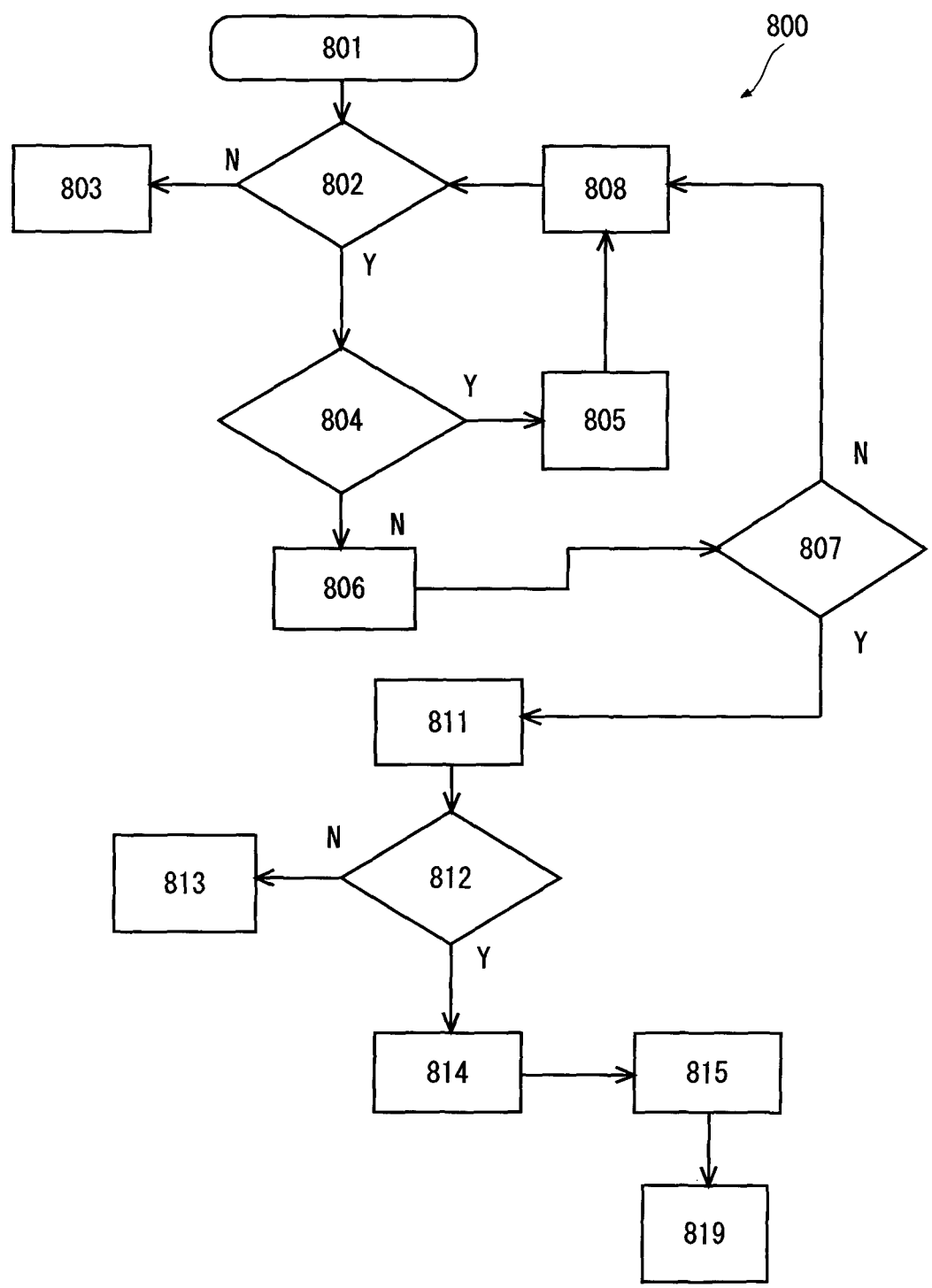
FIG. 8 is a respective flow diagram illustrating the algorithm at a high level according to respective possible implementation scheme.

FIGS. 6 to 8 are respective flow diagrams illustrating the algorithm at a high level according to three respective possible implementation schemes.

Reasoning for the following proposed algorithms (alternatives) is as follows:

The maximum number of retransmissions ("MAX # of Retransmission") may be performed first or second (see FIG. 5 and the associated portion of the description below);

MCS & RB allocation may be performed first or second (see FIG. 5 and the associated portion of the description below) on the basis that MCS & RB Allocation have less impact on network control;

Power (PWR) assignment may be the option before the last option, on the basis that D2D power control should change not too frequently, in order to reduce interference to other D2D users or to the network itself;

The <<Move to NW>> command may be treated as the last option in case nothing else works (please also see the alternative in the alternatives section).

With reference to each of FIG. 6 to FIG. 8, for simplification purposes the following part of the description refers to a "slow" outer loop algorithm for a direct link between wireless terminal 404 and the other wireless terminal 408, via the wireless terminal 404. It should be appreciated that this would also be applicable to control D2D terminal 408 to terminal 404 via terminal 408, and would also be applicable for out-of-coverage and intra-cell scenarios.

Also it should be appreciated that FIG. 6 to FIG. 9 are equally applicable to both UE1 and UE2 control if UE1 is inverted with respect to UE2.

FIG. 6 is a flow diagram illustrating the algorithm at a high level implemented at a network level e.g. a base station, or, an eNB or MME.

At step 601 the algorithm begins.

At step 602 a determination is made, as to whether the block error rate (BLER) of the D2D link, measured in UE2, is greater than a threshold value (Thr).

When the determination in step 602 is negative (NO), in step 603, the algorithm does not proceed further since there is no further action to perform.

When the determination in step 602 is positive (YES), in step 604 a further determination is made as to whether the number of retransmissions is less than or equal to a specified maximum number of retransmissions.

When the determination in step 604 is negative (NO), the algorithm moves to step 605, described further below.

When the determination in step 604 is positive (YES), in step 606 the network decides to change the UE1 modulation and coding scheme (MCS) and change the resource block (RB) allocation, and the algorithm then moves on to step 607.

In step 607, a further determination is made as to whether the order of the MCS currently set (according to step 606) is below a minimum or above a maximum specified order, and cannot be decreased or increased anymore, or the RB allocation that was changed in step 606 cannot be implemented due possibly to all resources having already been allocated to other users in direct communication (if the RB allocation that was changed was increased), or other users in legacy communication, through the network or e.g. for eNB communication.

When the determination in step 607 is positive (YES), the algorithm can moves to step 611, described further below, which is the first step in a first alternative of the algorithm, or alternatively can end at step 611.

When the determination in step 607 is negative (NO), the algorithm moves to step 608, in which the network transmits a control signal intended for UE1, the control signal comprising a command indicating that UE1 should or is allowed to increase the order of the MCS by a specified decrement below, or increment above, the value currently set and/or to allocate more RBs or less RBs or different RBs and/or which RBs.

Thus, the control signal indicates that UE1 should or is allowed to change the value of a parameter related to the quality of a D2D link between UE1 and UE2, this parameter being the possibly changed MCS order.

The algorithm then moves back to step 602.

Step 611, mentioned above, itself comprises the initial step in the remainder of the first alternative of the algorithm. In step 612, a determination is made, as to whether the number of retransmissions is less than or equal to a specified maximum number of retransmissions.

When the determination in step 612 is negative (NO), in step 613 the algorithm does not proceed further since there is no further action to perform.

When the determination in step 612 is positive (YES), in step 614 a further determination is made as to whether the block error rate (BLER) of the D2D link between UE1 and UE2, measured in UE2, is greater than a threshold value (Thr).

When the determination in step 614 is negative (NO), the algorithm moves to step 615, in which the algorithm does not proceed further since there is no further action to perform.

When the determination in step 614 is positive (YES), in step 616 the network decides to increase the maximum number of retransmissions by a specified increment, and the algorithm then moves on to step 617.

In step 617, a further determination is made as to whether the maximum number of retransmissions can be increased any further than the present number. The determination will depend on delay constraints and system constraints which are checked by the network for example with respect to the service type. As a possible alternative, this aspect could be implemented at the UE side particularly, for example, if the UE changes service type wherein delay and system constraints could change. For example, if D2D changes the service from data to video streaming where less delay is required, or as another example upon a change from data to voice.

When the determination in step 617 is positive (YES), the algorithm moves to step 618, in which the network transmits a control signal intended for UE 1, the control signal comprising a command indicating that UE1 should or is allowed to increase, by a specified increment relative to the present value, the maximum number of retransmissions via the D2D link between UE1 and UE2.

The algorithm then moves back to step 612.

When the determination in step 617 is negative (NO), the algorithm ends in step 619. Optionally, at step 619, the process continues at step 701 of FIG. 7, or indeed can start at this location.

FIG. 7 is a flow diagram illustrating another variant of the algorithm at a high level implemented at a network level e.g. a base station or an eNB or a MME.

This part of the algorithm commences at step 701.

In step 702 a determination is made, as to whether the currently set maximum number of retransmissions is less than or equal to a specified maximum number of retransmissions.

When the determination in step 702 is negative (NO), in step 703, the algorithm does not proceed further since there is no further action to perform.

When the determination in step 702 is positive (YES), in step 704 a further determination is made as to whether the estimated current block error rate (BLER) of the D2D link, measured in UE2, is greater than a threshold value (Thr).

When the determination in step 704 is negative (NO), the algorithm moves to step 705, in which the network decides to reduce UE maximum number of retransmissions by a specified decrement below the currently set value. The algorithm then moves to step 708 which is described further below.

When the determination in step 704 is positive (YES), in step 706 the network decides to increases UE1's maximum number of retransmissions by a specified increment above the currently set value. The algorithm then moves to step 707.

In step 707, a further determination is made as to whether the maximum number of retransmissions can be further increased.

When the determination in step 707 is positive (YES), the algorithm moves to step 708 for transmitting a command.

In step 708, which is reached when the determination in step 707 is positive (YES), the network transmits a control signal intended for UE1, the control signal comprising a command indicating that UE1 should increase, or be allowed to increase, the maximum number of retransmissions by a specified increment above the value currently set.

Thus, the control signal, which can be an increase, decrease or imposed value, indicates that UE1 should change the value of a parameter related to the quality of a D2D link between UE1 and UE2, this parameter being the maximum number of retransmissions.

The algorithm then moves back to step 702.

When the determination in step 707 is negative (NO), the algorithm moves to step 711 which is the first step of this alternative of the algorithm.

In step 712, a determination is made as to whether the block error rate (BLER) of the D2D link between UE1 and UE2, measured in UE2, is greater than a threshold value (Thr).

When the determination in step 712 is negative (NO), in step 713 the algorithm does not proceed further since there is no further action to perform.

When the determination in step 712 is positive (YES), the algorithm moves onto step 714.

In step 714 a further determination is made as to whether the transmit power of UE1 currently set is less than an allowed maximum value (MAX PWR).

When the determination in step 714 is positive (YES), the algorithm moves to step 715, in which the algorithm does not proceed further since there is no further action to perform.

When the determination in step 714 is negative (NO) because the power is equal to, or very close to, the maximum value, in step 716 the maximum allowed transmit power is increased by a specified increment, and the algorithm then moves on to step 717.

In step 717, a further determination is made as to whether the maximum allowed transmit power is limited. When it is limited, it cannot be increased any further than the present value. The determination will depend on interference constraints to other D2D or other legacy UE or network equipment. This can readily be checked by the network which knows all of the environmental characteristics since it is constantly receiving measurement from devices/eNBs etc.

The network can also impose power constraints if the UE does not have sufficient energy or wants to conserve UE energy.

When the determination in step 717 is negative (NO), the algorithm moves to step 718 (requiring the sending of a command which can be an increase, a decrease or an imposed value), in which the network transmits a control signal intended for UE1, the control signal comprising a command indicating that UE1 should increase, by a specified increment relative to the present value, the maximum allowed transmit power of UE1.

The algorithm then moves back to step 712.

When the determination in step 717 is positive (YES), the algorithm ends. Optionally at step 719, the process continues at step 801 of FIG. 8, which could also comprise the start of this further aspect of the algorithm.

FIG. 8 is a flow diagram illustrating another variant of the algorithm at a high level implemented at a network level e.g. a base station or an eNB, or MME.

In this variant the algorithm begins at 801 which can be the second step of the first or second alternative.

In step 802 a determination is made, as to whether the estimated current block error rate (BLER) of the D2D link, measured in UE2, is greater than a threshold value (Thr).

When the determination in step 802 is negative (NO), in step 803, the algorithm does not proceed further since there is no further action to perform.

When the determination in step 802 is positive (YES), in step 804 a further determination is made as to whether the currently set value of UE1 transmit power is less than a maximum allowed transmit power at which UE1 should transmit.

When the determination in step 804 is positive (YES), the algorithm moves to step 805, in which the network decides to reduce UE 1's maximum allowed transmit power by a specified decrement below the currently set value. The algorithm then moves to step 808 which sends a command from the network to the UE as described further below.

When the determination in step 804 is negative (NO), in step 806 the network decides to increase UE 1's maximum allowed transmit power by a specified increment above the currently set value. The algorithm then moves to step 807.

In step 807, a further determination is made as to whether the maximum allowed transmit power can be further increased.

When the determination in step 807 is negative (NO), the algorithm moves to step 808.

In step 808, which is reached when the determination in step 807 is negative (NO) the network transmits a control signal intended for UE1, the control signal comprising a command indicating that UE1 should increase the maximum allowed transmit power by a specified increment above the value currently set.

The algorithm then moves back to step 802.

When the determination in step 807 is positive (YES), the algorithm moves to step 811 which is the next step in this part of the algorithm.

From step 811, the algorithm moves onto step 812, although alternatively could start at this step.

In step 812, a determination is made as to whether the estimated current block error rate (BLER) of the D2D link, measured in UE2, is greater than a threshold value (Thr).

When the determination in step 812 is negative (NO), the algorithm terminates in step 813, as there is no further action to perform.

When the determination in step 812 is positive (YES), the algorithm moves onto step 814.

In step 814, the network decides to transmit a control signal to UE1 comprising a command to move the D2D link to the network, or only to UE1. The algorithm then moves onto step 815.

In step 815, the network transmits a control signal for UE1 comprising a command for UE1 and/or UE2 for the commanded UE(s) to move to the network.

In step 819, the algorithm ends.

Referring back to FIG. 5, it was noted that the UE2 inputs Reference Signal Received Power (RSRP) and Reference Signal Received Quality (RSRQ) are optional. With regard to the algorithm of FIGS. 6 to 8 however, possible adoption could be as follows. A further loop could be introduced based on either a comparison with an RSRP target or RSRQ target, or a comparison with minimum RSRP or RSRQ values noted. Alternatively, the noted condition UE2 BLER>Thr could be replaced with UE2 RSRP or RSRQ<Thr.

Figure 10:
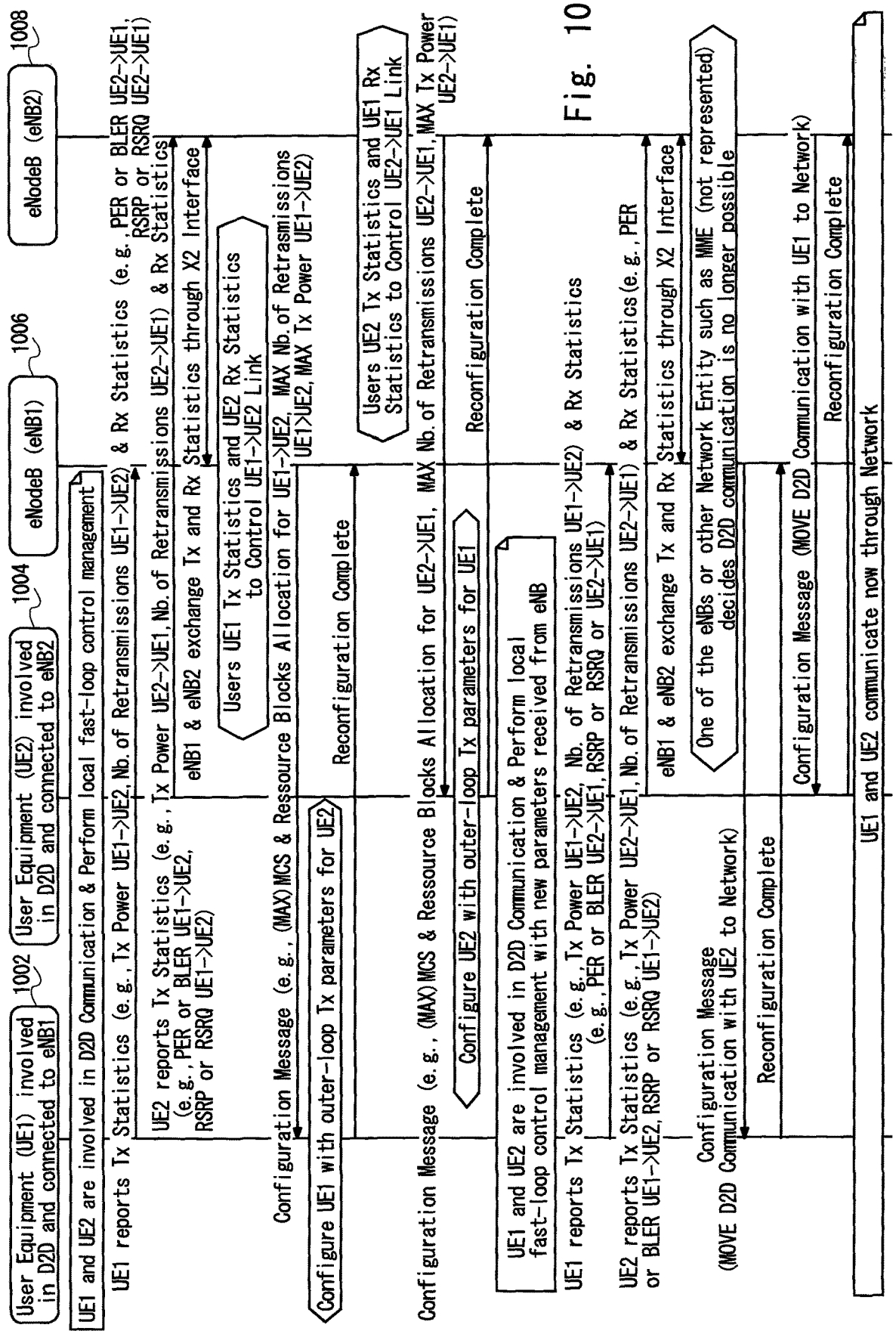
FIG. 10 is an envisaged Message Sequence Chart (MSC) for control of a quality link parameter of an Inter-Cell D2D link.

FIGS. 9 to 11 illustrate Message Sequence Charts (MSC) for different scenarios. In FIGS. 9 to 11, information regarding the Modulation Coding Scheme (MCS) has been removed for the sake of clarity and conciseness. UE1 and UE2 communicate with one another via a direct wireless link (D2D link).

FIG. 9 is an example of a Message Sequence Chart (MSC) for control of a quality link parameter of an Intra-Cell D2D link.

FIG. 10 is an example of a Message Sequence Chart (MSC) for control of a quality link parameter of an Inter-Cell D2D link.

FIG. 11 is an example of a Message Sequence Chart (MSC) for control of a quality link parameter of an Out-of-Coverage D2D link, where one of the wireless terminals is out of coverage of a base station, as shown in FIG. 3 (306).

In each of FIGS. 9 to 11, signalling messages are shown which are transmitted between a UE (UE1) 902, 1002, 1102 involved in a D2D link and another UE (UE2) 904, 1004, 1104 also involved in the D2D link. Signalling is also shown that occurs between the respective UEs (UE1, UE2) and a first eNodeB (eNB1) 906, 1006, 1106. Additionally, for the inter-cell scenario shown in FIG. 10, signalling is shown to and from a second eNodeB (eNB2) 1008.

While the aforementioned drawings relate to a scenario in which UE1 configuration occurs in a serial manner before UE2 configuration, in practice it is also possible and applicable that the configuration of UE2 could occur in a serial manner before that of UE1, or indeed both configurations could occur in parallel. Equally, the invention also provides that only one configuration might occur per D2D link.

Such options and alternatives are also applicable when the network acts to stop the connection. That is UE2's connection could be stopped before that of UE1, or indeed both connections could be stopped in parallel. Equally, the invention also provides that the network sends only a single message to both UEs (message per D2D link) to stop D2D communication.

Figure 12:
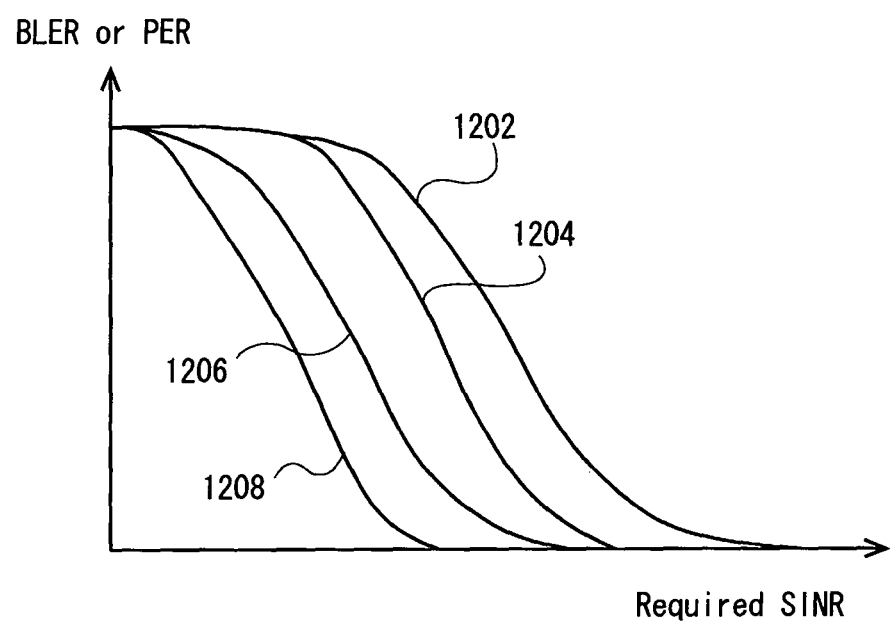
FIG. 12 is a graph showing how number of retransmissions can affect BLER & SINR.

FIG. 12 is a graph of BLER or PER versus different required signal-to-interference and noise ratio (SINR) for different numbers of retransmissions, showing how number of retransmissions can affect BLER & SINR. Each Retransmission improves SINR quality but increases communication delay & may require more resources to be allocated.

The uppermost curve 1202 is a graph of BLER or PER versus SINR for a first retransmission, the next curve 1204 is a graph of BLER or PER versus SINR for a second retransmission, the next curve 1206 is a graph of BLER or PER versus SINR for a third retransmission, and the lowermost curve 1208 is a graph of BLER or PER versus SINR for a fourth retransmission.

Figure 13:
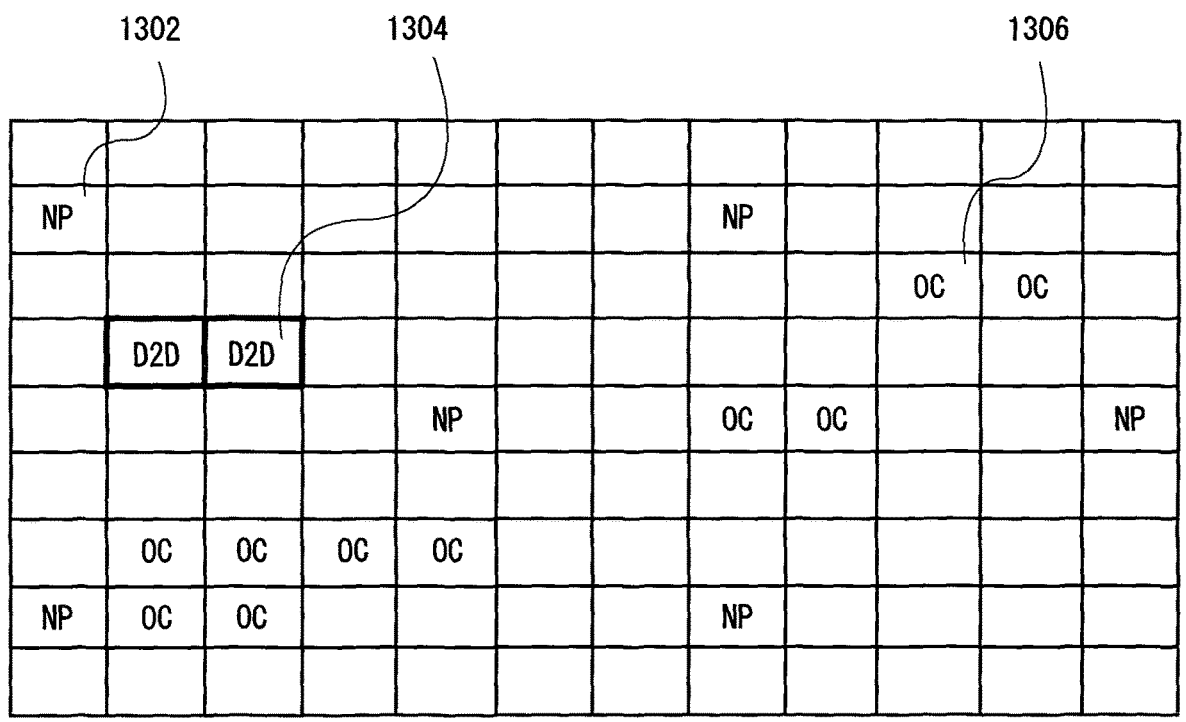
FIG. 13 is a time/frequency grid representing an example of MCS & RE (Resource Element) resource allocation performed by an eNB under good signal path conditions.

FIG. 13 is a time/frequency grid representing an example of MCS & RE (Resource Element) resource allocation performed by an eNB, and representative of experimentation performed within the context of the invention under good signal path conditions (providing a low error rate). In the figure, time is represented on the horizontal axis from left to right and frequency is represented on the vertical axis, and each small rectangle represents a resource element of a resource block. Resource elements 1302, labelled NP, are allocated to network pilot signals, resource elements 1304, labelled D2D, are allocated to D2D communications signals; and resource elements 1306, labelled OC, are allocated to other communications signals.

Initially only two resource elements were allocated for D2D communication using 64QAM (2^6=>a 64QAM symbol has 6 bits of information) in the time/frequency grid.

Note that current 3GPP standards only allows resource allocation by allocating whole resource blocks, each block comprising 12 subcarriers, 7 symbols for normal cyclic prefix (CP) configuration, or 6 symbols for Extended CP configuration. The current 3GPP standards do not provide for resource allocation by Resource Element, respective Resource Elements being represented by respective individual rectangles in FIG. 13 and FIG. 14.

Figure 14:
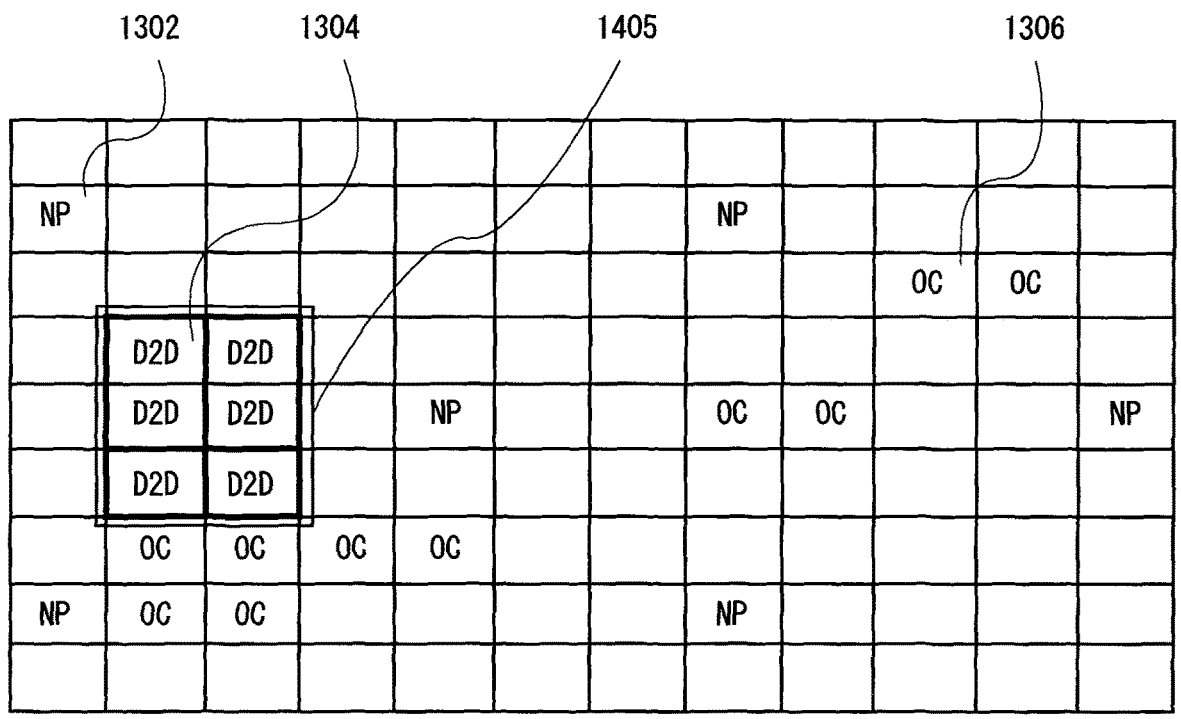
FIG. 14 is a time/frequency grid representing an example of MCS & RE (Resource Element) resource allocation performed by an eNB under poor signal path conditions.

FIG. 14 is another time/frequency grid representing an example of MCS & RE (Resource Element) resource allocation performed by an eNB, according to further experimentation, but under poor signal path conditions (causing high initial error rate). The eNB had initially allocated a higher modulation scheme, 64QAM, when the link quality was good. Because of the subsequent poor link quality, the eNB then allocated a lower modulation scheme because a QPSK-modulated signal is much more resistant to noise and interference than a 64QAM-modulated signal.

However, a penalty of using QPSK is that a QPSK symbol has only two bits of information and is therefore three times more resource-consuming than 64QAM (it uses three times as many bits of information). Therefore, three times as many resource elements are used as in the case of good signal conditions. This represents a potential problem.

In this poor-signal situation, the resource allocation is performed by the network insofar as the network should ensure that such decision is not taken at the UE which could interfere with other UEs or network equipment. The network must allow such allocation to the UE, in order to ensure that the UE does not interfere with other equipment (UE and/or network equipment). This can be because if the modulation scheme were not changed to a lower order, it would be necessary to increase the transmit power to a level that would cause such interference with other equipment. Also, if nearby RBs or Resource Elements (REs) are already busy, the network has to decide which extra RBs or REs to allocate when going from 64QAM to QPSK.

In the figure, a group 1405 of six resource elements are allocated to the D2D link, as compared to the two resource elements 1302 allocated in FIG. 13.

Figure 15:
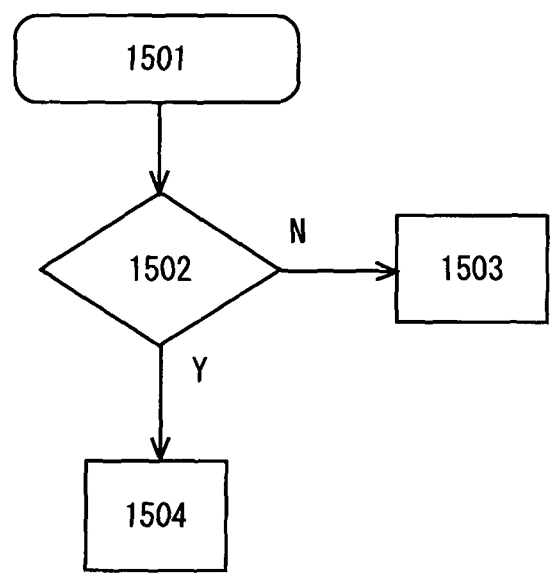
FIG. 15 is a flow diagram representing a further arrangement for the algorithm.

The invention alleviates this problem by ensuring that the link quality remains good. FIG. 15 is a flow diagram representing an algorithm that may be used in addition to one or more of the algorithms described above, for example in relation to FIG. 5 to FIG. 8. For example, according to a variation of the algorithm illustrated in FIG. 6, when the determination in step 602 is negative, instead of carrying out the step 603, the algorithm illustrated in FIG. 15 may be executed, and then the algorithm illustrated in FIG. 6 would return to the beginning step 601. That is, the algorithm starts at 1501 and then proceeds to a determination at 1502 of whether BER or PER UE2, is higher than THr. If so, it proceeds to 1504 for a decrease of retransmissions of UE1, or use of a higher modulation scheme. If at 1502 it is determined that BER or PER UE2 is not less than Thr, then it proceeds to 1503 to increase retransmissions of UE1 or a change in modulation scheme.

Figure 16:
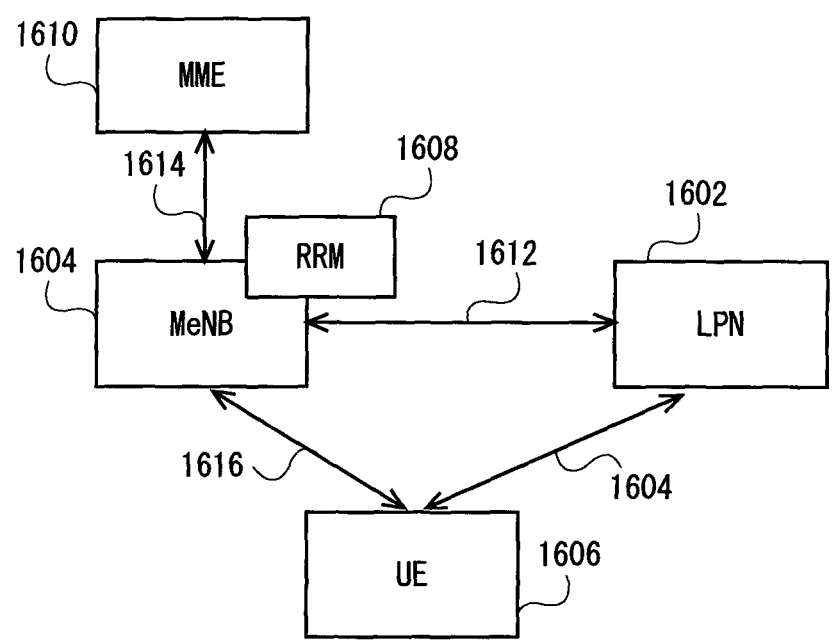
FIG. 16 illustrates an embodiment that includes the use of a so-called Low Power Node.

FIG. 16 illustrates an embodiment that includes the use of a so-called "Low Power Node" (LPN) 1602 instead of a user equipment (UE) for communicating via a D2D link 1604 with a UE 1606. A Macro eNB 1604 communicates, using a Radio Resource Management (RRM) entity 1608, with a Mobility Management Entity (MME) 1610 and also with the Low Power Node 1602. In this embodiment, the LPN 1602 can function in the same way as one (304; 404) of the two UEs (304, 306; 404, 408) functions, as described above for example in relation to FIG. 3 and FIG. 4, in order to transmit D2D link quality data to the network. Equally, the LPN can function in the same way as one (304; 404) of the two UEs functions, as described above, to control the link quality. In the embodiment shown in FIG. 16, the Radio Resource Management (RRM) entity 1608 is a centralized RRM.

According to an embodiment, the interface 1612 between a Macro eNB and the LPN is similar to, but not identical to, a so-called "X2 interface" that is used between base stations. It is envisaged that the LPN 1602 may have functionality that is similar to that of a base station entity. The arrows 1612, 1614 in FIG. 16 represent control signalling which is controlled by means of the Radio Resource Management (RRM) entity 1608 of the network. Also arrow 1616 represents interface between MeNB 1604 and UE 1606.

Figure 17:
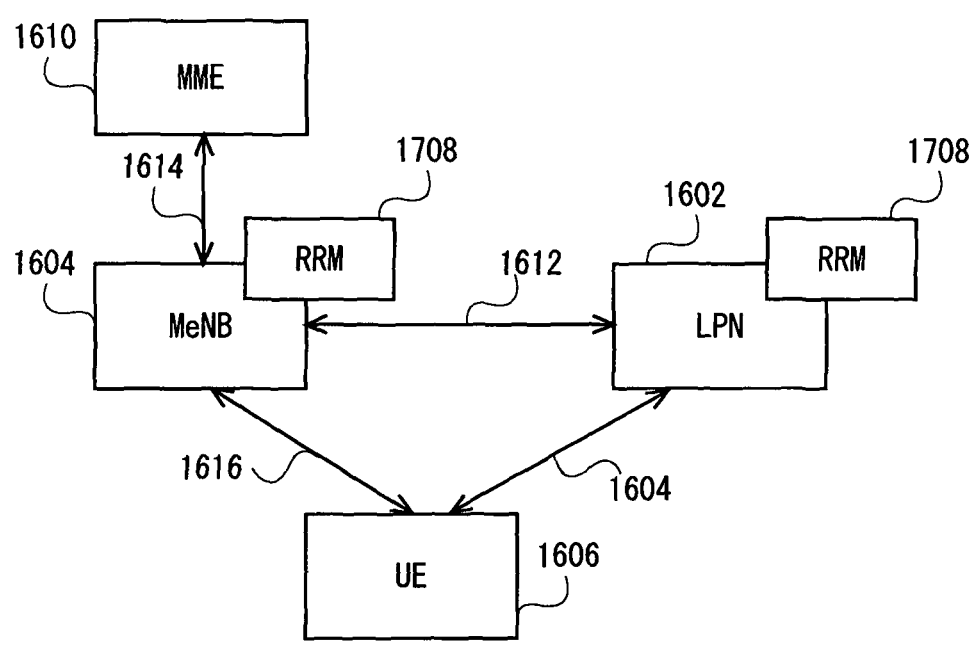
FIG. 17 illustrates an alternative embodiment to that of FIG. 16.

FIG. 17 illustrates another embodiment similar to that shown in FIG. 16. In the embodiment shown in FIG. 17, the Radio Resource Management (RRM) entity 1708 is a distributed RRM with single Radio Resource Control protocol.

The Low Power Node (LPN) 1602 may be a device or entity that is largely in accordance with the 3GPP document TR 36.932, which states:

"A low-power node generally means a node whose Tx power is lower than macro node and BS classes, for example Pico and Femto eNB are both applicable. Small cell enhancements for E-UTRA and E-UTRAN will focus on additional functionalities for enhanced performance in hotspot areas for indoor and outdoor using low power nodes."

Use of the LPN would allow increase of the coverage of the Macro eNB, which is another possible scenario in RAN2. Also the use of LPN is a possible scenario for use in RAN2 SCE (Small Cells Enhancements).

Another envisaged embodiment comprises at least one UE-Relay (UE-R) which is a UE with relaying capability. The UE-R may relay information to another UE-Relay or to the eNB. Thus, the UE Relay can act in the same way at one (304; 404) of the two UEs (304, 306; 404, 408) functions, as described above for example in relation to FIG. 3 and FIG. 4, in order to transmit D2D link quality data. Equally, the UE-Relay can function in the same way as one (304; 404) of the two UEs functions, as described above, to control the link quality.

This embodiment would be able to function in a similar way to the embodiment described above in relation to FIG. 3 (out-of-coverage case) but the out-of-coverage UE could also perform data communication with the network through the (one or more) UE-R, for example by means of either a single UE-R or a multi-hop transmission through multiple UE-Rs.

The claims, the above detailed description and the accompanying drawings together provide a technical teaching that makes it possible to put the inventive subject matter into practice.

The subject matter of the invention provides for a wireless terminal sending D2D measurements associated with one link and one wireless terminal.

The subject matter of the invention can also provide for a wireless terminal sending an indication of the type of D2D measurements which it sends.

The subject matter of the invention can also provide for the use of a double-loop comprising a "slow" loop for resource allocation, and transmission and reception parameters, and another, "fast" loop for link adaptation to radio conditions in the limit of the allocated resource allocation by the slow loop. As an example, the outer loop can set the maximum power to 100 mW and the faster loop adapts to this constraint, e.g. 99 mW if the environment is bad, or to 10 mW if the environment is good enough. This serves to prevent the UE1 transmitting to another UE2 with a power higher than the network allows.

However, with an alternative command, when eNB instead configures a target, the UE can increase and decrease the value around this imposed target (it can be below and above but converging to the target).

The slow loop imposes a limit of allocated resources and transmission and reception parameters. For example, the slow loop may set maximum power and the fast loop may adapt responsive to this setting of maximum power. However the fast loop can adapt to changes in the physical environment and can, for example, use less power than the power computed by the slow loop. The slow loop could also specify a range of values or a target value of power. Equally the slow loop could also specify a maximum value, range of values or target value for one or more other parameters that affect the quality of the D2D link, e.g. a maximum number of retransmissions.

The invention provides for a wireless terminal sending D2D link quality measurements and/or statistics to a network.

The network may use such quality measurements and/or statistics for a purpose such as MDT and/or network planning.

The network may use such quality measurements and/or statistics for a purpose such as "slow" outer-loop control.

Several possible algorithms of control and associated control elements have been described, along with signalisation schemes for implementing the invention.

Possible implementation alternatives will now be described briefly.

Respective UEs in communication via a D2D link may use uplink (UL) and/or downlink (DL) 3GPP Long Term Evolution (LTE) resources. Intra-cell, inter-cell or out-of-coverage scenarios are envisaged. The information relating to quality of the D2D link may be computed and sent per Wide-Band or per Sub-Band. For example, the quality of the link can be determined on all the resource blocks used by D2D, or only in one resource block used by D2D. Further, information relating to quality of link per frequency band, whether wide or narrow. Further information can be sent relative to a physical RB index or a physical RB number, or a range of physical RB indexes.

At least one implementation may include decrease of power or resource allocation instead of increasing power and resource allocation. It is envisaged to use only BLER (Block Error Rate) or only information relating to maximum number of retransmission(s) and not necessarily a combination of both BLER and maximum number of retransmission(s) (as shown in FIG. 6). As part of power (PWR) assignment, a range of power (e.g. a low limit and/or a high limit) may be specified. A target (variation around this value) may be specified. A maximum power may be specified. Any combination of Step 0, 1, 2, 3 (preferably in the same order), e.g. only 0 & 3 could be provided.

In FIGS. 6 to 8, "<" can be replaced with "<=" (e.g. Steps 1 & 2) and in some cases even with ">". Equally, ">" could also be replaced with ">=" or "<".

Another condition could be specified: ["If Time<Thr"=YES], which has a logical value of "TRUE" when "Time" is less than a threshold value "Thr", and when the value is TRUE a command is not sent. This would have the advantage of not reporting to often, or not sending configuration commands too often. It is envisaged that a time may be set to trigger for reports and for commands.

Offsets and hysteresis values may be added to the conditions.

It is envisaged that, in at least one implementation, a MME or other network entity controls the "slow" outer-loop, and not eNB.

The information relating to link quality may be transmitted in at least one message via RRC signalling or other similar configuration/reporting messages such as PUCCH, PUSCH or other, as used in 3GPP.

The configuration & reporting may be done periodically or by triggered events (periodically or aperiodically). Instead of PER (Packet Error Rate), BLER (Block Error rate) or BER (Bit Error rate) or FER (Frame Error Rate) or any other similar error rate parameter may be used to transmit the information relating to link quality.

Rx quality measurements RSRQ and RSRP could be used to improve D2D statistics.

It is envisaged to use statistics such as CQI (channel quality indicator), Estimated CQI (ECQI), Channel Condition Number (CN), Physical-Layer Throughput (ETPUT), RF path, PMI (precoding matrix indicator), RI (Rank Indicator) reported by UE for channel condition and BSR (Buffer Status Report) included in MAC frame.

It is also envisaged to use statistics such as Transmission Mode (TM) type e.g. TM1 to TM8 (or other from any further 3GPP releases) if the D2D link uses a TM which can't be identified by the network.

"MOVE to NW" command: Instead of moving the connection to the network, the network could allocate dedicated (more orthogonal) resources by indicating other RBs or other Resource Elements (REs) in the LTE time/frequency resource grid.

Use of other air interface technologies, other than 3GPP, is envisaged, to transport the signals described above, in particular the signals transmitting the information relating to the link quality information and the command signal from the network. Equally, it is envisaged that non-3GPP technology, such as Wi-Fi, or FlashLinQ or WiMax or Bluetooth or others may be used to provide the D2D wireless link between two D2D devices.

Figure 18:
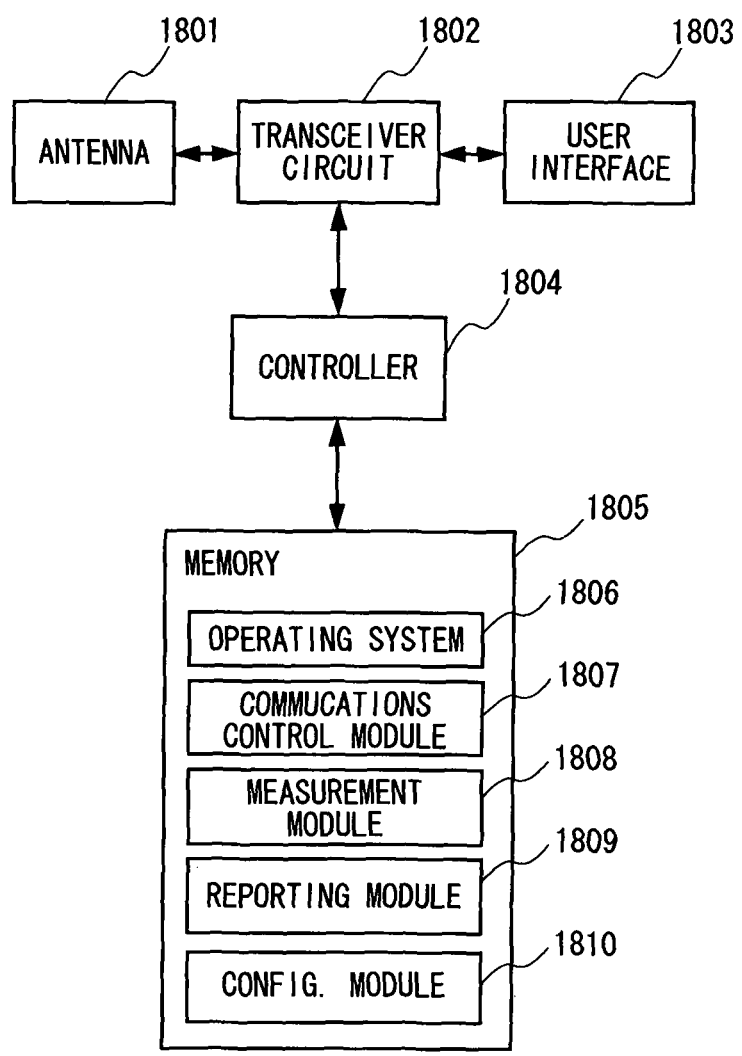
FIG. 18 is a schematic representation of a UE embodying the invention.

Turning now to FIG. 18, there is provided a schematic view of a D2D operative UE capable of controlling other UEs and comprising an Antenna 1801, Transceiver circuit 1802, User interface 1803, controller 1804, memory block 1805 itself comprising an Operating system, software 1806, a communications control module 1807 for D2D and eNB, which is also responsible of changing the Tx and Rx parameters upon the commands received from the eNB or other UEs, a measurement module 1808 to measure D2D Rx and Tx statistics for eNB upon the configuration message received from eNB directly from eNB or through another UE (and to be send directly to eNB or through other UE), a reporting module 1809 to report to eNB the D2D Rx and Tx statistics, and a configuration module 1810 to configure D2D UEs out of coverage or which are not under network control (upon the configuration message received from eNB directly from eNB or through another UE).

Figure 19:
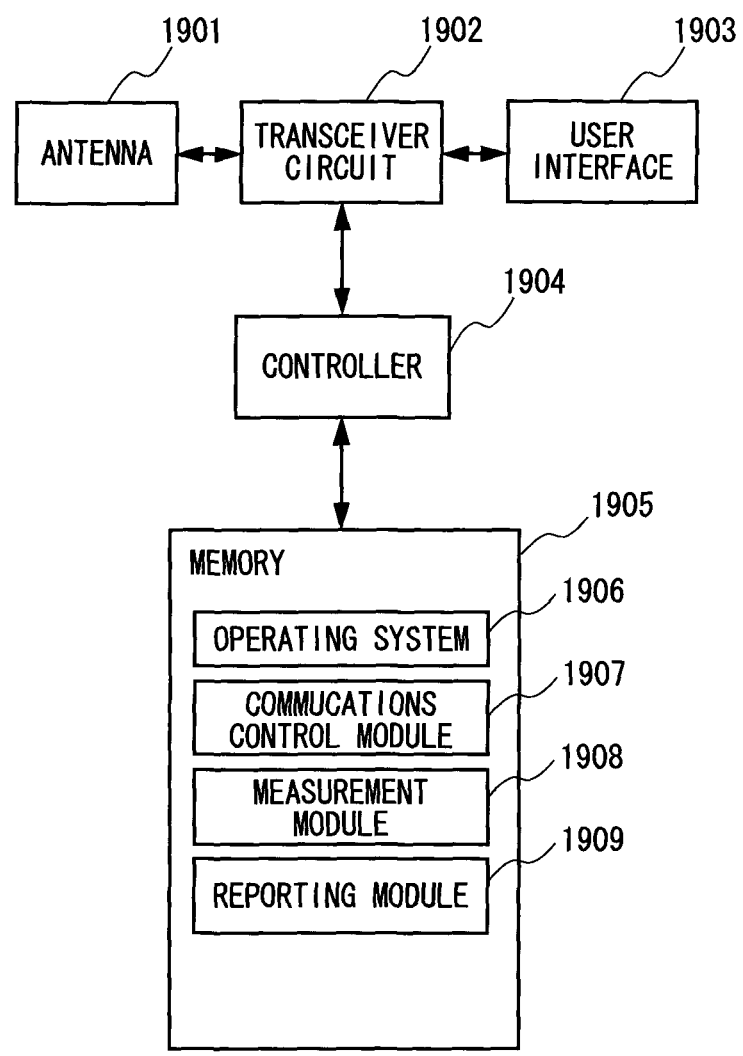
FIG. 19 is a schematic representation of a UE according to a further aspect of the invention.

With regard to FIG. 19, there is provided a schematic illustration of UEs of the invention but operative in a manner not capable of controlling other UEs. The UE comprises an Antenna 1901, Transceiver circuit 1902, User interface 1903, controller 1904, and memory block 1905 itself comprising operating system software 1906, communications control module 1907 for D2D and eNB and which is also responsible of changing the Tx and Rx parameters upon the commands received from the eNB or other UEs, measurement module 1908 to measure D2D Rx and Tx statistics for eNB upon the configuration message received from eNB directly from eNB or through another UE (and to be send directly to eNB or through other UE), and reporting module 1909 to report to eNB the D2D Rx and Tx statistics.

Figure 20:
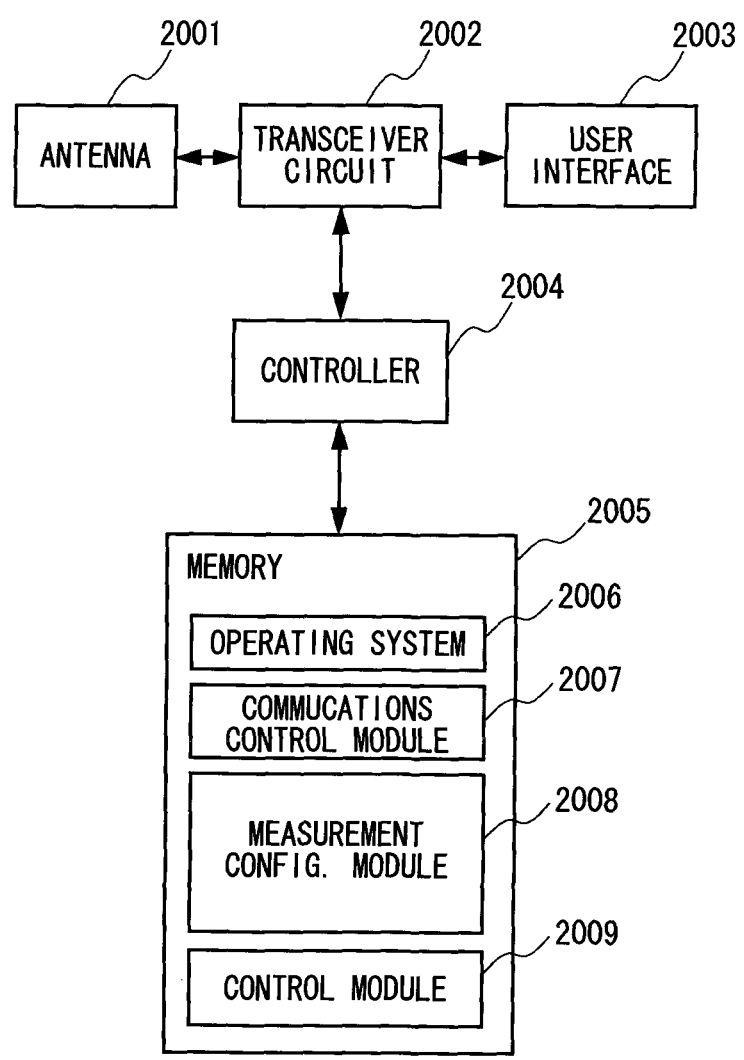
FIG. 20 is a schematic representation of a network node according to a further embodiment of the invention.

Turning lastly to FIG. 20, there is provided a schematic representation of a network node according to an embodiment of the invention such as an eNB and comprising an antenna 2001, a transceiver circuit 2002, network interface 2003 (with other eNB or MME etc. for another alternative when MME controls), controller 2004, and a memory block 2005 itself comprising an Operating system software 2006, a communication control module 2007 for communication with UE, D2D, other eNB, NW. (D2D communication block & legacy communication block with UE or eNB, etc), a measurement configuration module 2008 to send Configuration Messages to D2D (and other UE) and to receive Reconfiguration complete messages, and a control module 2009 to control Tx and Rx parameters for D2D UE.

This application is based upon and claims the benefit of priority from United Kingdom Patent Application No. 1305824.3, filed on Mar. 28, 2013, the disclosure of which is incorporated herein in its entirety by reference.

INDUSTRIAL APPLICABILITY

The present invention can be applied to a direct communication link between two wireless terminals, such as mobile radio communication devices, and in particular to such devices performing Device to Device (D2D) communication.

REFERENCE SIGNS LIST

102 BASE STATION
104 WIRELESS COMMUNICATION TERMINAL
106 WIRELESS COMMUNICATION TERMINAL
108 TRANSMIT A BEACON SIGNAL
302 BASE STATION
304 USER EQUIPMENT
306 USER EQUIPMENT
402 BASE STATION
403 BASE STATION
404 USER EQUIPMENT
408 USER EQUIPMENT
410 NETWORK CONNECTION
1202 BLER OR PER VERSUS SINR FOR A FIRST RETRANSMISSION
1204 BLER OR PER VERSUS SINR FOR A SECOND RETRANSMISSION
1206 BLER OR PER VERSUS SINR FOR A THIRD RETRANSMISSION
1208 BLER OR PER VERSUS SINR FOR A FOURTH RETRANSMISSION
1302 RESOURCE ELEMENTS, LABELLED NP
1304 RESOURCE ELEMENTS, LABELLED D2D
1306 RESOURCE ELEMENTS, LABELLED OC
1405 A GROUP OF SIX RESOURCE ELEMENTS ALLOCATED TO THE D2D LINK
1602 LOW POWER NODE (LPN)
1604 D2D LINK
1606 USER EQUIPMENT
1604 MACRO ENB
1608 RADIO RESOURCE MANAGEMENT (RRM) ENTITY
1610 MOBILITY MANAGEMENT ENTITY (MME)
1612 LPN INTERFACE BETWEEN A MACRO ENB AND THE LPN
1614 REPRESENT CONTROL SIGNALLING
1616 REPRESENTS INTERFACE
1708 DISTRIBUTED RRM WITH SINGLE RADIO RESOURCE CONTROL PROTOCOL
1801 ANTENNA
1802 TRANSCEIVER CIRCUIT
1803 USER INTERFACE
1804 CONTROLLER
1805 MEMORY BLOCK
1806 SOFTWARE
1807 COMMUNICATIONS CONTROL MODULE
1808 MEASUREMENT MODULE
1809 REPORTING MODULE
1810 CONFIGURATION MODULE
1901 ANTENNA
1902 TRANSCEIVER CIRCUIT
1903 USER INTERFACE
1904 CONTROLLER
1905 MEMORY BLOCK
1906 COMPRISING OPERATING SYSTEM SOFTWARE
1907 COMMUNICATIONS CONTROL MODULE
1908 MEASUREMENT MODULE
1909 REPORTING MODULE
2001 ANTENNA
2002 TRANSCEIVER CIRCUIT
2003 NETWORK INTERFACE
2004 CONTROLLER
2005 MEMORY BLOCK
2006 OPERATING SYSTEM SOFTWARE
2007 COMMUNICATION CONTROL MODULE
2008 CONFIGURATION MODULE
2009 CONTROL MODULE

The invention claimed is:

1. A method, performed by a user equipment (UE) configured to communicate with a base station and further configured to communicate with a second UE using a direct link, the method comprising:
  determining a value of reference signal received power (RSRP) for the direct link;
  further reporting, to the base station, a plurality of parameters related to communication via the direct link, for initiation of an assignment of dedicated resources for a corresponding direct link communication;
  receiving, from the base station, a radio resource control (RRC) configuration message comprising configuration information indicating resources to be used for the direct link communication; and when the second UE is outside of a coverage of the base station, and based on a comparison of the determined value of the RSRP for the direct link with a threshold, transmitting direct link control information comprising configuration parameters to the second UE via the direct link communication.

2. A user equipment (UE), configured to communicate with a base station and further configured to communicate with a second UE directly using a direct link, the UE comprising:
 a transceiver circuit which receives a reference signal via the direct link; and
 a processor configured to determine a value of reference signal received power (RSRP) for the direct link and to control the transceiver circuit to report, to the base station, a plurality of parameters related to communication via the direct link, for initiation of an assignment of dedicated resources for a corresponding direct link communication;
 wherein the transceiver circuit further receives, from the base station, a radio resource control (RRC) configuration message comprising configuration information indicating resources to be used for the direct link communication; and
 wherein, when the second UE is outside of a coverage of the base station, and based on a comparison of the determined value of the RSRP for the direct link with a threshold, the processor is further configured to control the transceiver circuit to transmit direct link control information comprising configuration parameters to the second UE via the direct link communication.

3. A wireless communications system comprising:
 a first user equipment (UE);
 a second UE; and
 a base station
 wherein the first UE is configured to communicate with a base station and further configured to communicate with a second UE using a direct link;
 wherein the first UE comprises:
  a transceiver circuit which receives a reference signal via the direct link, and
  a processor configured to determine a value of reference signal received power (RSRP) for the direct link and to control the transceiver to report, to the base station, a plurality of parameters related to communication via the direct link, for initiation of an assignment of dedicated resources for a corresponding direct link communication;
 wherein the base station comprises:
  a transceiver circuit configured to receive, from the first UE, the plurality of parameters related to the communication via the direct link,
  a processor configured to determine configuration information indicating a plurality of resources to be used for the direct link communication and transmits, to the first UE, a radio resource control (RRC) configuration message comprising the configuration information indicating the plurality of resources to be used for the direct link communication;
 wherein, when the second UE is outside of a coverage of the base station, and based on a comparison of the determined value of the RSRP for the direct link with a threshold, the processor of the first UE is further configured to control the transceiver to transmit direct link control information comprising configuration parameters to the second UE via the direct link communication.

* * * * *